US011935063B1

(12) United States Patent
Schwartz et al.

(10) Patent No.: US 11,935,063 B1
(45) Date of Patent: *Mar. 19, 2024

(54) FRAUD ALERT MANAGEMENT SYSTEM WITH REAL-TIME REMEDIATION AND INTEGRATION WITH THE ORIGINATING SYSTEM

(71) Applicant: Double Check Solutions, Inc., Austin, TX (US)

(72) Inventors: Joel Schwartz, Encino, CA (US); Anne Vivian Lee, Ellenton, FL (US)

(73) Assignee: Double Check Solutions, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/860,644

(22) Filed: Jul. 8, 2022

(51) Int. Cl.
*G06Q 20/40* (2012.01)
(52) U.S. Cl.
CPC .................. *G06Q 20/4016* (2013.01)
(58) Field of Classification Search
None
See application file for complete search history.

(56) References Cited

U.S. PATENT DOCUMENTS

| 7,175,074 | B2 | 2/2007 | Mejias | |
|---|---|---|---|---|
| 9,552,584 | B1 | 1/2017 | Bierbaum | |
| 11,004,074 | B1 | 5/2021 | Hiccox | |
| 11,144,917 | B1 * | 10/2021 | Schwartz | G06Q 20/4016 |
| 11,615,420 | B1 * | 3/2023 | Schwartz | G06Q 20/40 |
| | | | | 705/42 |
| 2003/0174823 | A1 | 9/2003 | Justice | |
| 2004/0111371 | A1 * | 6/2004 | Friedman | G06Q 20/04 |
| | | | | 705/42 |
| 2004/0243588 | A1 | 12/2004 | Tanner | |
| 2005/0125338 | A1 | 6/2005 | Tidwell | |
| 2005/0256747 | A1 | 11/2005 | Hellrigel | |
| 2006/0106717 | A1 * | 5/2006 | Randle | G06Q 20/12 |
| | | | | 705/45 |
| 2007/0203741 | A1 | 8/2007 | Ordille | |
| 2008/0076504 | A1 | 3/2008 | Jenkins | |
| 2008/0215471 | A1 | 9/2008 | Michelassi | |

(Continued)

FOREIGN PATENT DOCUMENTS

WO 2014071261 5/2014

*Primary Examiner* — Bruce I Ebersman
*Assistant Examiner* — Matthew Cobb
(74) *Attorney, Agent, or Firm* — Sheppard Mullin Richter & Hampton LLP

(57) ABSTRACT

Embodiments provide a fraud alert management system with real-time remediation and integration with the originating system. The system obtains an electronic file that includes an exception information data structure comprising exception information representing one or more events and automatically parses the exception information into events for the customers associated with the events. For each customer, the system sends an event notification message with a link to an authentication interface of the payor financial institution. After the customer is authenticated, the system provides a user interface that displays information for each event and a display element for reporting fraud. Responsive to the customer selecting the display element for reporting fraud, the system sends a fraud reporting messages to the payor financial institution and the payee financial institution.

12 Claims, 20 Drawing Sheets

(56) References Cited

U.S. PATENT DOCUMENTS

| | | |
|---|---|---|
| 2009/0106846 A1 | 4/2009 | Dupray |
| 2009/0164387 A1 | 6/2009 | Armstrong |
| 2009/0271277 A1 | 10/2009 | Bishop |
| 2010/0006643 A1 | 1/2010 | Epstein |
| 2010/0223470 A1 | 9/2010 | Lord |
| 2010/0268696 A1 | 10/2010 | Nightengale |
| 2010/0274691 A1 | 10/2010 | Hammad |
| 2011/0087598 A1 | 4/2011 | Bozeman |
| 2011/0125643 A1 | 5/2011 | Cameo |
| 2011/0150206 A1 | 6/2011 | Pickford |
| 2011/0213699 A1 | 9/2011 | Johnson |
| 2012/0054093 A1 | 3/2012 | Schamer |
| 2012/0066132 A1 | 3/2012 | Bates |
| 2012/0143747 A1 | 6/2012 | Sunde |
| 2013/0097076 A1* | 4/2013 | Love ............... G06Q 20/3255 705/42 |
| 2013/0159080 A1 | 6/2013 | Wu |
| 2015/0026060 A1* | 1/2015 | Krietzman ......... G06Q 20/3221 705/44 |
| 2015/0073986 A1* | 3/2015 | Kligman ........... G06Q 20/0425 705/44 |
| 2015/0339637 A1 | 11/2015 | Krietzman |
| 2015/0339641 A1 | 11/2015 | Krietzman |
| 2015/0339671 A1 | 11/2015 | Krietzman |
| 2015/0379644 A1 | 12/2015 | Danielak |
| 2016/0071106 A1* | 3/2016 | Choudhuri ............ G06Q 20/34 705/44 |
| 2019/0347664 A1 | 11/2019 | Agrawal |
| 2021/0350340 A1 | 11/2021 | Lai |

\* cited by examiner

FIG. 4

HOLLYWOOD Credit Union

NSF DASHBOARD | NSF ACCOUNTS | SUPPORT | REPORTS | HELP

☑ ACCOUNTS: ANNE LEE

XXXX
XXXX
XXXXXXXXXXX
XXXXXXXXXXX
XXXXXX
XXXXXXX
XXXX
XXXX
XXXXXXXXXX
XXXX
XXXX
FREE CHECKING

XXXX
Oct. 20, 2001

| TODAY'S NSF | NSF HISTORY | | | | |
|---|---|---|---|---|---|
| CURRENCY PAY ⓘ 402 $0.00 | TIME TO ACT ⓘ 4 HR, 44 MIN | | | AMOUNT DUE ⓘ $0.00 | 410 |
| ACCOUNT 2042-09 | DESCRIPTION INDIANA JONES EXCAVATING | AMOUNT $281.75 | 408 CREDIT UNION DECISION COURTESY PAY | MEMBER DECISION | CREDIT UNION DECISION ⌄ |
| ACCOUNT 2042-09 | DESCRIPTION MOON WALK OF FAME | AMOUNT $25.00 | CREDIT UNION DECISION COURTESY PAY | CREDIT UNION DECISION MEMBER TO PAY RETURN TO PAYER REPORT FRAUD | |
| ACCOUNT 2042-09 | DESCRIPTION EASY RIDER CYCLES | AMOUNT $50.00 | CREDIT UNION DECISION COURTESY PAY | MEMBER DECISION | CREDIT UNION DECISION ⌄ |
| ACCOUNT 2042-09 | DESCRIPTION RODEO FANCY CLOTHIER | AMOUNT $320.22 | CREDIT UNION DECISION RETURN | MEMBER DECISION | CREDIT UNION DECISION ⌄ |
| ACCOUNT 2042-09 | DESCRIPTION HOLLYWOOD STUDIOS APTS | AMOUNT $2,500.00 | CREDIT UNION DECISION RETURN | MEMBER DECISION | CREDIT UNION DECISION ⌄ |

Reset All | View Communication History | REVIEW

400

← 700

← 606

Easy Decisioning

I Want to Pay ›

| | Account | Description | Amount | | Member Decision |
|---|---|---|---|---|---|
| P | $834.10 | INDIANA JONES EXCAVATING | $281.75 | Credit Union Decision COURTESY PAY | CREDIT UNION DECISION › |
| P | $834.10 | MOON WALK OF FAME | $25.00 | Credit Union Decision COURTESY PAY | CREDIT UNION DECISION › |
| P | $834.10 | EASY RIDER CYCLES | $50.00 | Credit Union Decision COURTESY PAY | CREDIT UNION DECISION › |
| P | $834.10 | RODEO FANCY CLOTHIER | $320.22 | Credit Union Decision RETURN | CREDIT UNION DECISION › |
| P | $834.10 | HOLLYWOOD STUDIOS APTS | $2,500.00 | Credit Union Decision RETURN | CREDIT UNION DECISION › |

← 702

[ Reset All ]  [ View Communication History ]  [ REVIEW ]

FIG. 7

HOLLYWOOD
CREDIT UNION

| Anne Lee Account | Courtesy Pay ⓘ | Time to Act ⓘ | Amount Due ⓘ | | ⓘ Need help ? |
|---|---|---|---|---|---|
| XXXXX2042 | $356.75 | 4 hr, 44 min | $356.75 | | Exit |

800 ⟶

Step 1 of 2: Decide what you want to do
↳ 802

804 ⟶ Reset All

| Account | Description | Amount | | | |
|---|---|---|---|---|---|
| 2042-09 | INDIANA JONES EXCAVATING | $281.75 | Credit Union Decision ⓘ | Automatic decision based upon historic activity | |
| | | | Use Courtesy Pay | I will pay | > |
| Account | Description | Amount | | | |
| 2042-09 | MOON WALK OF FAME | $25.00 | Credit Union Decision | Automatic decision based upon historic activity | |
| | | | Use Courtesy Pay | I will pay | > |
| Account | Description | Amount | | | |
| 2042-09 | EASY RIDER CYCLES | $50.00 | Credit Union Decision | Automatic decision based upon historic activity | |
| | | | Use Courtesy Pay | I will pay | > |
| Account | Description | Amount | | | |
| 2042-09 | RODEO FANCY CLOTHIER | $320.22 | Credit Union Decision | Automatic decision based upon historic activity | |
| | | | Return | Report Fraud | > |
| Account | Description | Amount | | | |
| 2042-09 | HOLLYWOOD STUDIOS APTS | $2,500.00 | Credit Union Decision | Automatic decision based upon historic activity | |
| | | | Return | Credit Union Decision | > |

BACK    REVIEW

1. Review and prioritize    2. Select payment method    3. Confirm and submit    Expire 11/17/2021 at 10:00pm EST ◎ Deadline to make changes 1d 7h 55m ◀─ 1102

You've saved fees, avoided missed payments and identified fraud with DoubleCheck!

| You Saved! | |
|---|---|
| NSF Fees | $$$.$$ |
| Returned Fees* | $$$.$$ |
| Late Fees* | $$$.$$ |
| Total Saved | $$$.$$ |

Review your payment selections.

DoubleCheck service charge      $20.00

[Coupon Code] [Redeem]

No code? Reach out to a representative for help.◎

Select service charge payment method

○ Credit / Debit card   ○ Available balance   ○ Cash

| ▭ Credit / debit card | $284.85 |
|---|---|
| Transactions payment | $270.00 |
| + Convenience fee (5.5%) | $14.85 |
| will process immediately | Edit ✎ |

| $ Available balance | $85.00 |
|---|---|
| will process immediately | Edit ✎ |

*estimated

| Today's NSF  NSF History | | | |
|---|---|---|---|
| Currency Pay ⓘ<br>$281.75 | Time to Act ⓘ<br>3 hr, 40 min | Amount Due ⓘ<br>$0.0 | |
| Account<br>2042-09 | Description<br>INDIANA JONES EXCAVATING | Amount<br>$281.75 | Credit Union Decision<br>Courtesy Pay | Member Decision<br>Report Fraud ⌄ |
| Account<br>2042-09 | Description<br>MOON WALK OF FAME | Amount<br>$25.00 | Credit Union Decision<br>Courtesy Pay | Member Decision<br>Credit Union Decision ⌄ |
| Account<br>2042-09 | Description<br>EASY RIDER CYCLES | Amount<br>$50.00 | Credit Union Decision<br>Courtesy Pay | Member Decision<br>Credit Union Decision ⌄ |
| Account<br>2042-09 | Description<br>RODEO FANCY CLOTHIER | Amount<br>$320.22 | Credit Union Decision<br>Return | Member Decision<br>Credit Union Decision ⌄ |
| Account<br>2042-09 | Description<br>HOLLYWOOD STUDIOS APTS | Amount<br>$2,500.00 | Credit Union Decision<br>Return | Member Decision<br>Credit Union Decision ⌄ |

FIG. 14

How do I get started when...

I don't have extra funds.

DoubleCheck still works for you!

Review and reprioritize transactions to make sure the most important items are taken care of.

EXAMPLE SCENARIO

To make sure your rent is paid, you can take control and prioritize rent over your phone bill and car payment.

I can pay for items.

Use credit or debit card, available balance, or even cash (deposited in person) to pay for all or some of the highest priority items.

Credit or Debit Card

Cash deposit
At your nearest branch

See future and pending transactions by clicking the binoculars.

I have money elsewhere.

To build your available balance, transfer funds to your account through your favorite payment app or between current accounts.

Add to your balance now, or at any time!

venmo  Zelle  PayPal

Apply for a micro-loan  CA$H

Transfer funds between accounts

Future and Pending Transactions

| Date to Post | Description | Amount |
|---|---|---|
| 06/21/2022 | Paycheck | 1,514.23 |
| 06/21/2022 | Verizon bill | -54.25 |
| 06/22/2022 | Utilities | -47.82 |
| 06/25/2022 | Car loan Pmt. | -483.65 |

FRAUD ALERT MANAGEMENT SYSTEM WITH REAL-TIME REMEDIATION AND INTEGRATION WITH THE ORIGINATING SYSTEM

CROSS REFERENCE TO RELATED APPLICATIONS

The present application is related to U.S. Patent Publication No. US 2015/0026060 A1, filed Jul. 7, 2014, entitled "FINANCIAL ALERT MANAGEMENT SYSTEM HAVING A MOBILE INTERFACE," [abandoned] the disclosure thereof incorporated by reference herein in its entirety.

The present application is also related to U.S. Pat. No. 11,144,917 B1, issued Oct. 12, 2021, entitled "ALERT MANAGEMENT SYSTEM WITH REAL-TIME REMEDIATION AND INTEGRATION WITH THE EXCEPTION ORIGINATING SYSTEM," the disclosure thereof incorporated by reference herein in its entirety.

FIELD OF THE INVENTION

A technology platform for real-time management of time-sensitive exception notifications and integration with the overdraft allowance originating system.

BACKGROUND

Various technologies exist to provide alerts to users. The existing technologies have various technical problems and other deficiencies. In many cases, the technology provides an alert, but lacks a technical mechanism for the user to take action. In other cases, where multiple parties are involved, the technology is deficient in that it fails to enable users to take action and provide necessary real-time updates to all of the involved parties' systems. In some cases, where an entity provides limited access to their servers and/or other computer systems, manual notification of user action may be required. This is a technical limitation, especially when there is a time-sensitive need for a user to receive an alert, take action on the alert and have the entity, whose systems provide limited access, updated on the action. Often, prior systems include a manual notification to such entities which is ineffective with there is a time-sensitive deadline. These and other technical problems exist.

Alert management systems have applicability to many industries and many practical applications. Without limitation, one practical application relates to various fintech solutions. In particular, various technologies exist to facilitate the ability for a customer to be notified of an action that needs to be taken with respect to a financial or other account. These technologies suffer from the above-referenced and other drawbacks. Moreover, the technical drawbacks of prior systems in the fintech space are exacerbated by some of the regulatory issues, complexity and multiple parties involved in the system. Multiple examples of this exist.

As just one example, the technical and other implications of what happens when a negotiable instrument (such as, for example, a check or an ACH withdrawal) is not honored by the financial institution associated with the account on which the negotiable instrument is drawn, i.e., the payor bank are explained below.

It is possible that a negotiable instrument may be generated that for a number of different reasons may not be honored by the financial institution associated with the account on which the negotiable instrument is drawn, i.e., the payor bank. One reason might be that there are insufficient funds available in the account on which the negotiable instrument is attempting to be drawn. This is generally termed a non-sufficient funds (NSF) event. Similarly, a situation where the funds deposited in the account have not yet cleared (i.e., making the funds unavailable) is generally termed an uncollected funds (UCF) event. In this description, both NSF events and UCF events will be referred to as NSF events, unless specified otherwise.

The reason for the insufficient (i.e., inadequate) funds may be that the account is overdrawn (i.e., an overdraft has occurred, and money has been withdrawn from the account in an amount that has caused the available balance in the account to be less than zero) or because the amount listed on the negotiable instrument exceeds the available balance in the account even though that balance is an amount greater than zero but less than the amount listed on the negotiable instrument. Since checks, drafts, substitute checks and ACH withdrawals are negotiable instruments that are processed using the normal clearing method versus other transactions that are approved and cleared at the point of the transaction like ATM withdrawals, on-us check and draft cashes, and point of sale transactions, the financial institutions associated with the account my refuse to pay the negotiable instrument (in this example a non-preauthorized withdrawal request) and return the negotiable instrument as unpaid.

Unfortunately, even though the payor's financial institution may refuse to honor a negotiable instrument if it is drawn against insufficient or unavailable funds, the reality is that if the bearer of the negotiable instrument (i.e., the payee) does not physically come to the payor's financial institutions to cash the negotiable instrument but instead deposits the check into his/her account (i.e., payee account) at a different financial institution, then via overnight processing the payor's financial institution may automatically pay/credit the amount listed on the negotiable instrument to payee's account. Then, only after payor's financial institution performs a clearing process, will payor's financial institution learn that the negotiable instrument actually caused an NSF event (also known as an NSF occurrence).

On the payor side of the equation, payor's financial institution will generate an NSF notification and issue a NSF notice. Once the payee's financial institution sends the item back in the return check file, the payee's financial institution will repay the amount received less a charge for the risk incurred. Further, the payor financial institution will not honor the negotiable instrument, and will send the payor an NSF notification via first class mail, and additionally charge the payor a fee for generating a "bad" negotiable instrument.

On the payee side of the equation, the payee is sent a Returned Deposited Item (RDI) notice, and generally will be charged a fee from his/her financial intuition for the negotiable instrument. Additionally, the payee may have written negotiable instruments against the payor's negotiable instrument thereby creating a snowball effect of had instruments.

At this point, the payee is left with the sole responsibility of collecting from the payor the outstanding monetary amount listed on the negotiable instrument as well as any associated penalties, costs and fees. This may lead the payee to bring legal action against the payor. Moreover, the payee's financial institution may also report the payor to a database for bad check writers such as, for example, Check Connection, TeleCheck, Shared Check Authorization Network ("SCAN") or ChexSystems. Finally, knowingly passing a "bad check" is a crime in most states with a range of criminal penalties.

Each business day, every depositary financial institution generates Exception Information (EI) following reconciling accounts with the corresponding negotiable instruments received the previous business day. The EI may identify either all transactions that were presented the previous day that resulted in insufficient funds or only the items presented that caused an insufficient balance. Typically, for each NSF occurrence, the EI includes information about the corresponding account and the corresponding account holder. Each financial institution may also flag items that triggered an overdraft allowance/courtesy pay as well. In the description that follows, each EI may be accompanied by information that flags items that triggered an overdraft allowance/courtesy pay.

In order to better understand the above discussed problem, the problem is now describe in detail with reference to FIG. 1. FIG. 1 is a block diagram of an example of an implementation of a known way of paying with a negotiable instrument 100 between two people. The negotiable instrument 100 may be any type of transaction check, ACH, point of sale, draft, or similar negotiable instrument. In this example, the first person is a payor 102 and the second person is a payee 104. The payor 102 has a payor account 106 at a payor financial institution (FI) 108. The payee 104 has a payee account 110 at a payee FI 112. In this example, the payor FI 108 and payee FI 112 are in signal communication with each other over a signal path 114 which may include any known communication network 116. The communication network 116 may be a computer network such as, for example, the Internet, or a proprietary secure network. The signal path 114 between the payor FI 108 and payee FI 112 may include a payor computer server 118 (at the payor FI 108) and a payee computer server 120 (at the payee FI 112). The payor 102, payee 104, or both, may be business entities or individuals. The payor account 106, payee account 110, or both, may be checking accounts. The communication network 116 may be in signal communication with a regional Federal Reserve Bank 117.

In an example of operation, the payor 102 generates 122 the negotiable instrument 100 that lists a monetary amount and passes it to the payee 104 physically or electronically. In this example, the negotiable instrument 100 is drawn on the payor account 106 such that the payor 102 is a "Drawer" of the payor account 106 and the payor FI 108 is a "Drawee" because the payor FI 108 is where the negotiable instrument 100 can be presented for payment from the payor account 106. The payee 104 deposits the negotiable instrument 100 into the payee account 110 physically or electronically. Once the negotiable instrument 100 is deposited into the payee account 110, the payee FI 112 may present the negotiable instrument 100 to the payor FI 108 for payment via the signal path 114 that includes the communication network 116. In response, the payor FI 108 sends a payment 132 in the monetary amount listed on the negotiable instrument 100 via payor computer server 118. The payor FI 108 may utilize a Check 21 system or other interbank transaction system.

In this example, once the payor FI 108 has sent the payment 132 to the payee FI 112, the payor FI 108 withdraws the funds from the payor account 106 and determines whether sufficient funds are available in the payor account 106 to pay the listed monetary amount of the negotiable instrument 100. If the funds are available in the payor account 106, the listed monetary amount of the negotiable instrument 100 is withdrawn from the payor account 106 to satisfy the payment 132 made by the payor FI 108. If, instead, the payor FI 108 determines that there are insufficient funds in the payor account 106 to pay the listed monetary amount of the negotiable instrument 100, the clearing process designates the negotiable instrument 100 as causing an NSF occurrence and then places it as an NSF item on an EI that will be generated the next day by the payor FI 108. In this example, the clearing process may be performed by a computer system such as, for example, a reconciliation system 134. The reconciliation system 134 may be optionally part of the payor server 118 or another independent computer system of the payor FI 108. The reconciliation system 134 may include software that includes rules and decisions engines/modules to reconcile the amount paid on behalf of the payor 102 with the funds available from the payor account 106. The reconciliation system 134 has access to the payor FI 108 customer lists and corresponding accounts such that it may generate a daily EI 136 that includes either all items presented that result in a non-sufficient balance or all NSF occurrences with the corresponding negotiable instruments that caused the NSF occurrences, the corresponding accounts of the negotiable instruments, and the corresponding customer information of the accounts. This EI 136 may then be received and reviewed by a manager 138 of the payor FI 108.

In some exceptional cases, the manager 138 notices the payor 102 is listed on the EI 136 as a result of negotiable instrument 100 causing a NSF occurrence and the manager 138 subjectively considers the payor 102 an important or favorite customer of the payor FI 108. The manager 138, in some instances, may have the discretion to have the payor FI 108 pay the negotiable instrument 100 and because the negotiable instrument is then marked "pay," a NSF notification 139 is sent to the payor 102 if the balance is still insufficient and the payee FI 112 does not receive the NSF item back in the returned items file.

In another example, the manager 138 or other FI 108 representative may notify the payor 102 of the need to cover the negotiable instrument 100 on the EI. In order to cover the instrument 100, the payor must physically pay the manager or a designee, and the manager or designee must locate the NSF record in the payor FI 108 system and manually mark the negotiable instrument 100 as "pay."

But if the payor 102 does not deposit the funds within the time allowed by the payor FI 108, the payor FI 108 will send the item to the payee FI 112 in the returned check file marked as NSF.

As noted above, this process is entirely time-sensitive yet requires manual operations. If the payor does not pay the required amount within the FI predetermined time period, the payor will still be listed as having an NSF occurrence, and the associated negotiable instrument that caused the NSF occurrence will not be honored and will be returned for insufficient funds. Furthermore, even if the payor commences payment of the required amount within the FI predetermined time period, the payment may not settle until after expiration of the FI predetermined time period, with the same result.

SUMMARY OF THE INVENTION

One aspect of the invention relates to an improved technology platform for a financial alert management and real-time remediation system (FAMS). The platform may include some or all of the following technical components and features.

The FAMS includes a set of computer-software modules (executed on a processor) that can generate alerts, also referred to herein as notifications, and allow a customer to manage and control an outcome, within a designated period of time, based upon the customer's decisions and actions in a real-time environment. The FAMS provides a technical solution that leverages the real-time communication to empower customers, including individuals and businesses, to act to minimize expenses that would otherwise be incurred as well as protect their credit standing, reputation, and identity. In addition, it allows a protective and secure means to exchange information, remedy situations, and provide options in a real-time environment, that will benefit the customer.

The FI electronically generates exception information (EI) describing one or more events, (e.g., NSF or other events) and automatically transmits the EI to the platform. The system may be configured so that the EI has a particular data structure. One component of the data structure may include information about specific rules applicable to the specific events in the EI. The rules may be based on a set of information related to the particular events and a set of rules in a rules database. Thus, the rules for one event may differ from those of another. The platform parses the EI into events, processes the events in the EI in accordance with the rules, and generates a customized electronic notification to a customer along with a link. The link enables the customer to access the platform after authentication by a single sign on (SSO) feature associated with the customer account at the FI, for example using a browser execution on a customer device. After authentication, the FI SSO interface may redirect the customer browser to the platform. The platform generate a user interface to display the events, a time frame for response, action options (e.g., pay, report fraud, return the negotiable instrument unpaid), any fees associated with the action (which may vary from one user to the next based on the rules associated with each event), and if a pay action is selected, one or more payment options, including payment options that are enabled directly from the platform, without the user having to use a separate website or application.

After the customer views the exception notification, they may choose an action via a user interface that presents a set of options, including the option to provide a payment to address the event. If the customer selects the pay action, the platform facilitates real-time communication of the customer selection and any payment information received from the customer to the FI to enable the prompt and automated posting of payment directly to the customer account without the need for further manual interaction.

The FAMS reduces the occurrence of a non-payment event where the payor FI refuses to pay a negotiable instrument generated by a payor having a payor account at the payor FI, where the negotiable instrument has caused a non-sufficient funds (NSF) event because the monetary amount of the negotiable instrument exceeds the available funds amount in the payor account.

The FAMS may include a communication module, a database, a timing module, a second communication module, a decision module, a payment module, and a settlement module. A controller may be in signal communication with the first communication module, second communication module, payment module, timing module, and database. The controller is configured to control the operation of the system. The first communication module is configured to receive an EI, payor contact data, and a FI predetermined time period from the payor FI. The payor FI produces the EI that includes all of the events presented and processed through nightly processing that resulted in a final non-sufficient balance.

The payor contact data includes contact information for payor, and the FI predetermined time period for receiving funds to cover the NSF event before the occurrence of the non-payment event where the payor FI refuses to pay the negotiable instrument. The database is configured to store the NSF events from the EI and utilize the contact information for the payor from the payor contact data. The timing module is configured to generate a FAMS time period based on the FI predetermined time period. The second communication module is configured to attempt communication with the payor based on the contact information for the payor and, if successful, communicate to the payor the NSF event, options to take action to change the order of the events by selecting "Pay", "Return", or "Fraudulent", and/or paying the amount necessary to cure the NSF event. The payment module is configured to receive a payment from the payor.

As an example of operation, the system performs a method that reduces the occurrence of a non-payment event where the payor FI refuses to pay the negotiable instrument generated by the payor, where the negotiable instrument has caused a NSF event because the monetary amount of the negotiable instrument exceeds the available funds amount in the payor account. The method may include (electronically) receiving the EI (e.g., as a data structure) including, for example, payor contact data, FI predetermined time period, rules and/or other data from the payor FI, parsing the data structure to extract the various components, storing the data items, including the NSF events from the EI, and storing the contact information for the payor from the payor contact data.

The method may further include generating a FAMS time period based on the FI predetermined time period, and attempting communication with the payor based on the contact information for the payor. If the attempted communication is successful, the method may include communicating to the payor in real time the NSF event, the option to take action, the amount necessary to cure the NSF event, and the FAMS time period. The method may include receiving a payment from the payor.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 4 depicts an example user interface that may be provided to the customer according to some embodiments of the disclosed technologies.

FIG. 7 depicts an example second user interface that may be provided to the customer for easy select dispositioning according to some embodiments of the disclosed technologies.

FIG. 8 depicts an example user interface that may be provided to the customer for AI decisioning based upon previous activity according to some embodiments of the disclosed technologies.

FIG. 11 depicts an example user interface that may be provided to the customer for how much did I save analytics according to some embodiments of the disclosed technologies.

FIG. 14 depicts an example user interface that may be provided to the customer by the real-time fraudulent item reporting tool according to some embodiments of the disclosed technologies.

FIG. 17 depicts an example user interface a customer may employ to request ACH warehouse analytics according to some embodiments of the disclosed technologies.

FIG. 18 depicts an example user interface that may be provided to the customer by the real-time fraudulent item reporting tool according to some embodiments of the disclosed technologies.

The figures are not exhaustive and do not limit the present disclosure to the precise form disclosed.

DETAILED DESCRIPTION

Embodiments of the disclosed technology include a financial alert management system with real-time remediation (FAMS) that may interact with one or more FI, one or more customer electronic devices, and one or more external payment provider systems. In the described embodiments, the FAMS is a separate system from the payor FI. For example, the FAMS may comprise a server programmed with computer instructions to be operated to provide services to various FIs as described herein. In other embodiments, some or all of the elements of the FAMS may be provided and/or operated by the payor FI as part of its internal system. The payor FI may be a bank, savings and loan, credit union, trust company, mortgage loan company, or a similar FI. The external payment providers may be, for example, credit card companies, online payment companies, or similar FIs.

The FAMS may include a server programmed with a set of software modules that allow a customer to manage and control an outcome, within a designated period of time, based upon the customer's decisions and actions in a real-time environment. It also includes intelligent data analytics that derive scores based upon historical data based upon current data from a variety of input sources. The FAMS empowers customers, including individuals and businesses, to act to minimize expenses that would otherwise be incurred as well as protect their credit standing, reputation and identity. In addition, the FAMS allows a protective and secure means to exchange information, remedy situations, and provide options in a real-time environment, that will benefit the customer.

Figure 1:
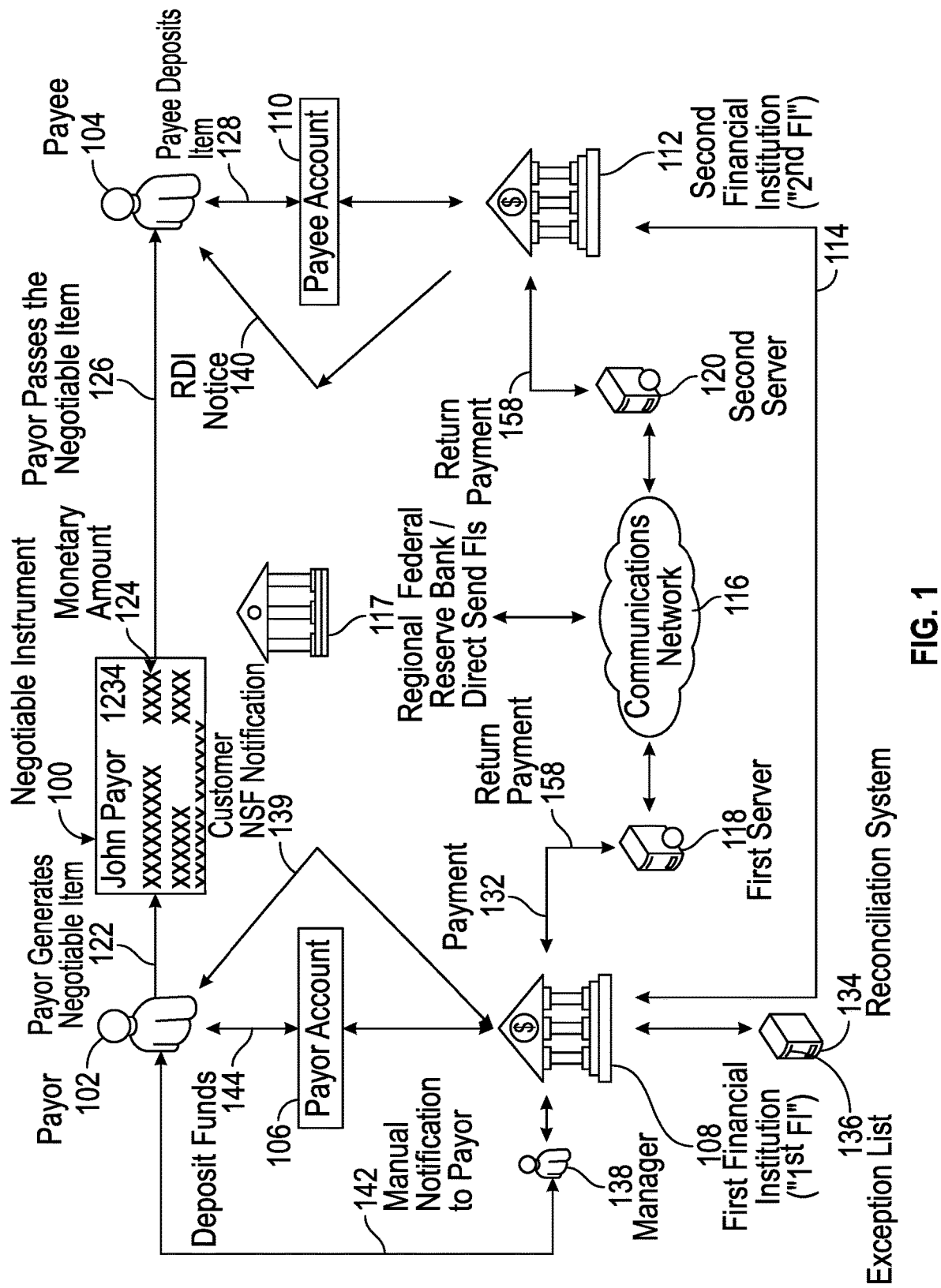
FIG. 1 is a block diagram of an example of an implementation of a known way of paying with a negotiable instrument between two people.
Figure 2:
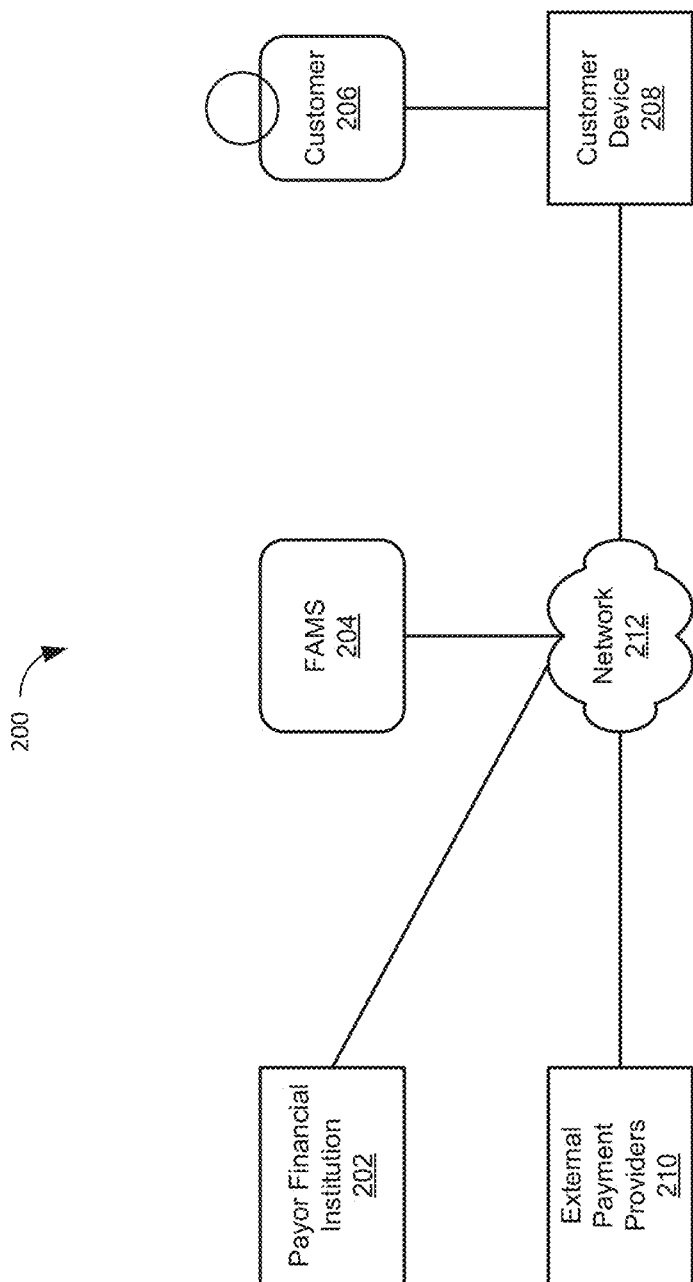
FIG. 2 is a block diagram for a financial system according to some embodiments of the disclosed technology.

FIG. 2 is a block diagram for a financial system 200 according to some embodiments of the disclosed technology. Referring to FIG. 2, the financial system 200 may include a financial alert management system with real-time remediation (FAMS) 204 that may be in network communication (e.g., via network 212) and interact with one or more payor financial institution systems 202, one or more customer devices 208 and one or more external payment provider systems 210.

The FAMS 204 may be implemented as one or more networked computer systems, for example as described in detail below. In the described embodiments, the FAMS 204 is separate system from the payor financial institution system 202. For example, the FAMS 204 may be operated to provide services to the financial institutions. In other embodiments, some or all of the elements of the FAMS 204 may be provided and/or operated by the payor financial institution 202 as part of its internal system.

The payor financial institution may be a bank, savings and loan, credit union, trust company, mortgage loan company, or a similar financial institution. The external payment providers 210 may be, for example, credit card companies, online payment companies, or similar financial institutions.

The customer devices 208 may be operated by a customer 206 having a financial account at the payor financial institution. The customer devices 208 may include, for example, smart phones, tablets, personal computers, and similar electronic devices. The one or more networks 212 (e.g., wired or wireless networks, the internet or other networks) may interconnect and enable communication between the elements of the financial system 200.

Overdraft Allowance and Courtesy Pay Item Handling

Related U.S. Pat. No. 11,144,917 B1 provides a financial alert management and real-time remediation system (FAMS) that allows customers to remedy the above-described NSF events in real time. However, financial institutions also generate other items that are not included in the exceptions process because they are paid (referred to herein as "other items presented"). For example, items are presented each day that include paid items, items and transactions that are NSF due to insufficient funds, and items and transactions that are paid if the financial institution offers Overdraft Allowance or Courtesy Pay services. Embodiments of the disclosed technologies provide an improved FAMS (hereinafter simply "FAMS") that creates a total view for the customer of all items presented (whether paid or not), and allows customers to be fully in control of which items they want to pay and which items, if any, they want to return. As noted above, these items, unlike regular NSF exceptions (being returned for insufficient balance) are not included in the exceptions process because they are paid, and as a result these "other items presented" are not segregated in an exceptions job to be reviewed. Therefore, the core processors have not made a report of these "other items presented" available to any external partners.

One drawback of the current system is that paid items that are overdrawn are not reported in any segregated report or job to readily display them to a customer. In addition, these items are considered paid so there is no pre-established automated system to return these items if the customer requests them to be returned. Therefore, making changes to a paid item is currently a manual, time consuming, and risky process. Risk occurs when a customer wants an item returned but the return deadline for the item has passed. Such an item is considered a "late return" and could be kicked back as an unaccepted late return, and the bank would be liable for the item.

Figure 3:
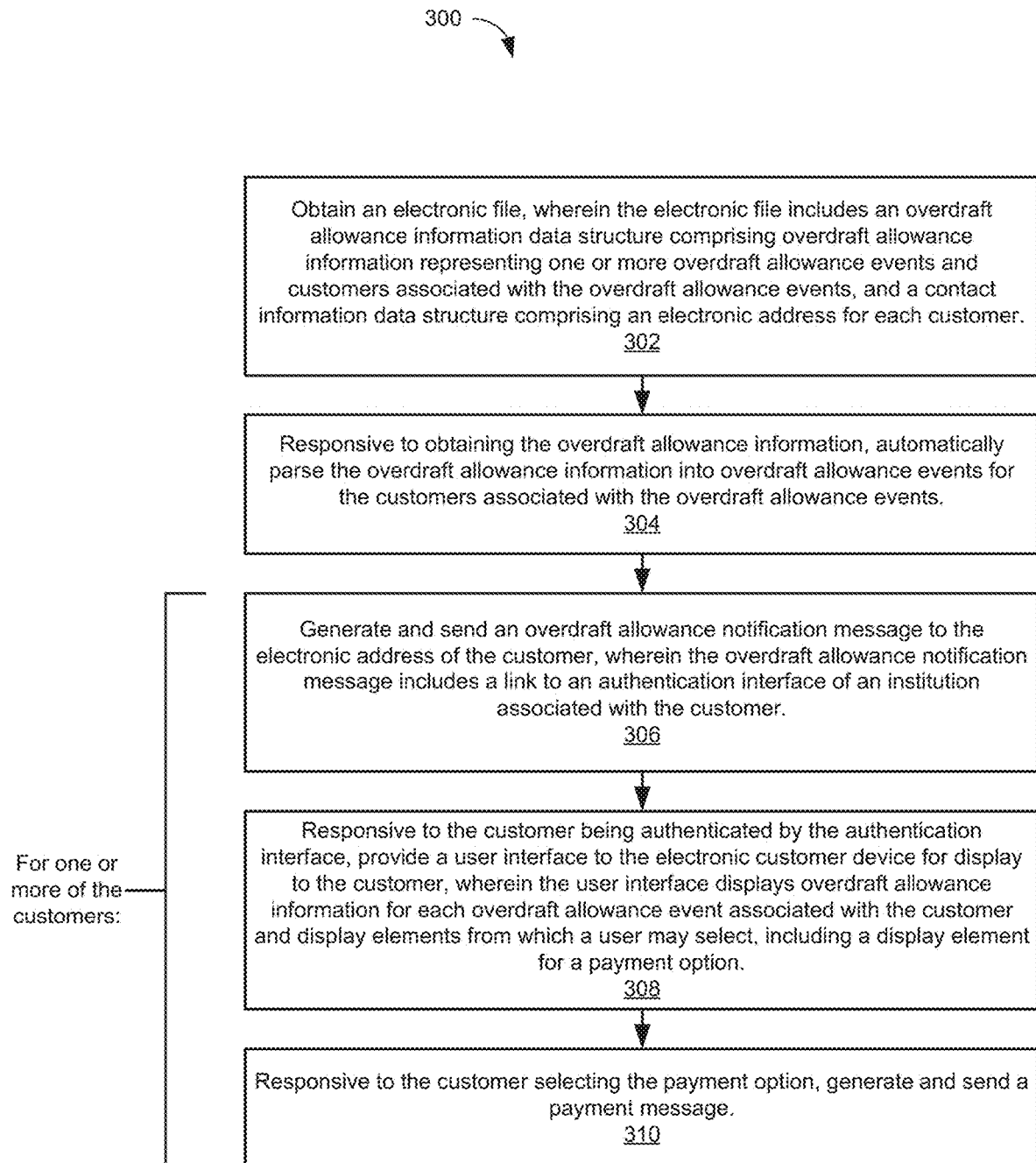
FIG. 3 is a flowchart illustrating a process for a customer to manage Overdraft Allowance or Courtesy Pay items in the customer's account (collectively referred to herein as "overdraft allowance events") with a financial institution according to some embodiments the disclosed technologies.

FIG. 3 is a flowchart illustrating a process 300 for a customer to manage Overdraft Allowance or Courtesy Pay items in the customer's account (collectively referred to herein as "overdraft allowance events") with a financial institution according to some embodiments the disclosed technologies. For example, the process 300 may be employed for the customer to manage an NSF event in the customer's checking account when a check drawn on the account exceeds the available balance of the account at the time of presentment, but does not exceed an overdraft allowance amount of the financial account. The process 300 is described with reference to FIGS. 2 and 3, and may be executed by the FAMS 204 of FIG. 2.

The elements of the disclosed processes are presented in one arrangement. However, it should be understood that one or more elements of the processes may be performed in a different order, in parallel, or omitted entirely. Furthermore, the processes may include other elements in addition to those presented. For example, the processes may include error-handling functions if exceptions occur.

Referring to FIG. 3, the process 300 may include obtain an electronic file, at 302. The electronic file may include an overdraft allowance information data structure comprising overdraft allowance information representing one or more overdraft allowance events and customers associated with the overdraft allowance events. The file may include a contact information data structure comprising an electronic address for each customer. The file may include rules specific to each instance/customer that differ from the rules for another instance/customer.

The file may include information describing the events as well as customer information regarding the customers. The information may include the date and time the event was generated, a unique identifier code (UIC) to uniquely identify each event, an account number of the involved customer's account, instrument number(s) of the involved negotiable financial instrument(s) (for example, such as a check number), a monetary amount of each involved negotiable financial instrument, and other information.

The customer information may include the name of the customer, a customer number, contact information of the customer, and other information. The contact information of the customer may include email addresses, phone numbers, and other contact information.

The FAMS 204 may obtain the electronic file electronically from the payor financial institution 202 in a variety of ways. In some embodiments, the FAMS 204 may poll the payor financial institution 202 to obtain the electronic file. In other embodiments, the payor financial institution 202 may push the electronic file to the FAMS 204. In some embodiments, the payor financial institution 202 may provide an access process or application programming interface (API) for the FAMS 204 to obtain the electronic file. In some embodiments, the FAMS 204 may obtain the electronic file by employing robotic process automation that emulates keystrokes of an employee of the payor financial institution 202. In some embodiments, a combination of these techniques may be employed. In some embodiments, the FAMS may request a specific process in that allows access to the core system for obtaining the electronic file. These techniques may be performed in a highly encrypted security protocol environment.

This technical integration of the FAMS and the payor financial institution to obtain the electronic file is not conventional, and employs a novel technical collaboration between the FAMS computer systems and those of the payor financial institution. Conventionally, the process of receiving the electronic file from an FI is implemented manually, in whole or in part. These manual processes consume valuable time in a process where time is of the essence. The described automated electronic collaboration between the payor FI and the FAMS occurs nearly instantaneously, thereby giving the payor more time to address the event.

Referring again to FIG. 3, the process 300 may include, responsive to obtaining the overdraft allowance information, automatically parsing the overdraft allowance information into overdraft allowance events for the customers associated with the overdraft allowance events, at 304. After this parsing, the process 300 may include one or more of the operations that follow for one or more of the customers.

For example, the process 300 may include generating and sending an overdraft allowance notification message to the electronic address of the customer, at 306. The overdraft allowance notification message may include a link to an authentication interface of an institution associated with the customer.

For example, referring again to FIG. 2, after obtaining the overdraft allowance information, the FAMS 204 may identify the customer 206 according to the customer information in the overdraft allowance information, and may provide some or all of the overdraft allowance information to the customer device according to the contact information in the customer information. For example, the notification may include information regarding the time interval during which the customer may cure the overdraft allowance event, such as the end time of the interval and the time remaining in the interval. The notification messages may include emails, text messages, voicemails, robocalls, and similar messages.

The link may be a hyperlink to a single sign-on (SSO) authentication interface of the payor financial institution 202. The customer 206 may enter the link in a browser executing on the customer device 208 to reach the SSO interface, and may be authenticated by logging into the SSO interface, for example by providing a preset user ID and password. In some embodiments, the authentication process may include multifactor authentication.

Referring again to FIG. 3, the process 300 may include, responsive to the customer being authenticated by the authentication interface of the financial institution, providing a user interface to the electronic customer device for display to the customer, at 308. The user interface may display overdraft allowance information for each overdraft allowance event associated with the customer and display elements from which a user may select, including a display element for a payment option. For example, referring again to FIG. 2, the FAMS 204 may provide the user interface to the customer device 208.

FIG. 4 depicts an example user interface 400 that may be provided to the customer according to some embodiments of the disclosed technologies. Referring to FIG. 4, the user interface 400 may list the involved negotiable financial instrument(s), at 402, and for each of the instruments, information such as check number, and amount. The user interface may also list one or more service fees charged by the financial institution for handling the exception. The customer may select the fee(s) for payment using the user interface. The user interface may list the total amount due. The customer may simply select the total amount due for payment.

The user interface 400 may list a FI decision for each instrument, at 408. The FI decision represents the decision made by the FI regarding the disposition of the instrument. For example, the FI may decide the instrument should be paid, should be paid by courtesy pay, or should be returned. The interface 400 also allows the customer to override these decisions, at 410. For example, the customer may decide to pay the instrument, to return the instrument to the payee, to report the instrument as fraudulent, or to stop payment of the instrument. Responsive to such a customer selection, the FAMS may send an electronic message representing the decision to the FI.

Referring again to FIG. 3, the process 300 may include, responsive to the customer selecting a payment option, generating and sending a payment message, at 310. The payment message may cause a transfer of a payment to the institution, for example into the financial account of the customer. The payment may be greater than or equal to the difference between the monetary amount of the negotiable financial instrument(s) and the monetary balance of the financial account. For example, the payment may be the sum of the service fee(s) and the difference between the monetary amount of the negotiable financial instrument and the monetary balance of the financial account.

In some embodiments, the user interface may list more than one payment method in the user interface. For example, the payment methods may identify accounts the customer has with the external payment providers 210. In such embodiments, responsive to the customer selecting one or more of the payment methods, the FAMS 205 (or third party) may transfer the payment monetary amount to the financial account of the customer according to the selected payment method(s).

In some embodiments, the user interface may provide options for actions other than to pay the NSF. For example, the user interface may present an option for a customer to report a fraud concerning the involved negotiable financial instrument(s). In such embodiments, responsive to the customer selecting the option to report a fraud, the FAMS 204 may report the fraud concerning the negotiable financial instrument to the payor financial institution 202.

In some embodiments, responsive to expiration of the time interval for curing the NSF event, the FAMS system may provide an indication of the expiration of the time interval in the user interface, and may disable or remove the payment option from the user interface.

Pricing Overdraft Fees from a Pricing Model Grid

FI institutions often charge a customer a fee for a declined transaction. For example, an FI may charge a customer an overdraft fee for an instrument that is overdrawn. The instrument may be a debit card, a check, an ACH instrument, or a similar instrument. The fee is generally fixed regardless of the amount of the instrument. For example, the fee may be set at $30. To many this fee will seem excessive when the amount of the instrument is similar or less than the fee. However, in current systems the amount of the fee is fixed, regardless of the amount of the instrument.

In some embodiments, the fee may vary based on the amount of the related transaction. For example, the fee may be defined in a pricing grid. An example pricing grid is presented below as Table 1. Referring to table 1, the pricing grid establishes multiple ranges for the transaction amounts, up to a predetermined debt limit. For each range, the pricing grid establishes a related fee amount. For example, for a transaction amount below $25.00, the pricing grid of Table 1 establishes a $5.00 fee. For the highest range, the fee amount may be the default service fee. In some embodiments, the pricing grid may assign a different fee code to each range and fee amount. Referring again to Table 1, for the foregoing example the fee code is 01.

TABLE 1

| Transaction Range ($) | Fee Amount ($) | Fee Code |
|---|---|---|
| 0-25.00 | 5.00 | 01 |
| 25.01-75.00 | 10.00 | 02 |
| 75.01-150.00 | 15.00 | 03 |
| 150.01-250.00 | 20.00 | 04 |
| 250.01-1,000.00 | 25.00 | 05 |
| 1,000.01-Debit Limit | Default Service Fee Amount | 06 |

Figure 5:
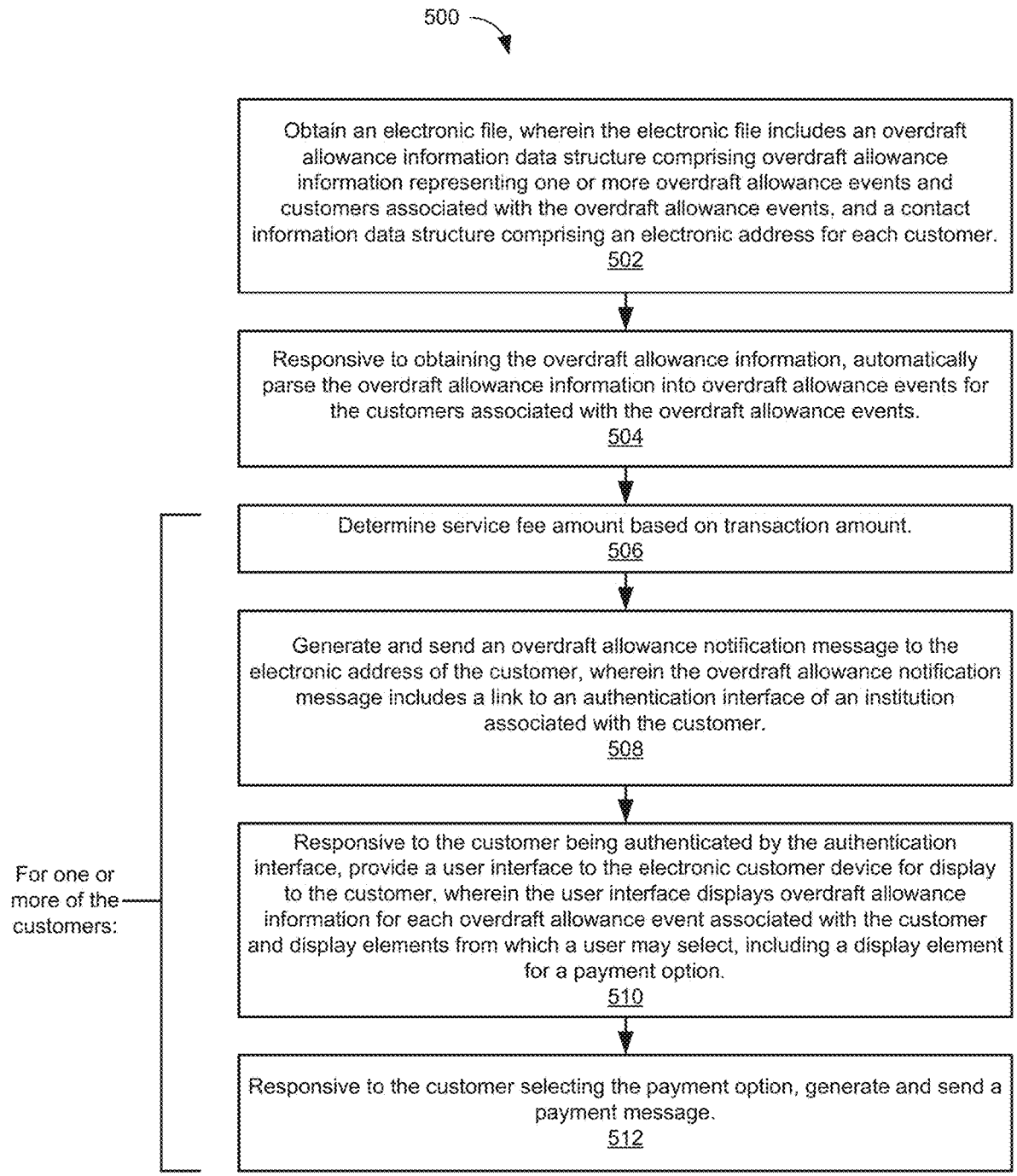
FIG. 5 is a flowchart illustrating a process for pricing overdraft fees from a pricing model grid according to some embodiments the disclosed technologies.

FIG. 5 is a flowchart illustrating a process 500 for pricing overdraft fees from a pricing model grid according to some embodiments the disclosed technologies. For example, the process 500 may be employed for the customer to manage an NSF event in the customer's checking account when a check drawn on the account exceeds the available balance of the account at the time of presentment, but does not exceed an overdraft allowance amount of the financial account. The process 500 is described with reference to FIGS. 2 and 5, and may be executed by the FAMS 204 of FIG. 2.

Referring to FIG. 5, the process 500 may include obtaining an electronic file, at 502. The electronic file, and the manner of obtaining the electronic file, may be as described above with reference to FIG. 3.

Referring again to FIG. 5, the process 500 may include, responsive to obtaining the overdraft allowance information, automatically parsing the overdraft allowance information into overdraft allowance events for the customers associated with the overdraft allowance events, at 504. After this parsing, the process 500 may include one or more of the operations that follow for one or more of the customers.

For example, the process 500 may include determining the service fee based on the amount of the related transaction, at 506. In some embodiments, the pricing grid may be stored within the FAMS. In these embodiments, the FAMS may index the grid with the transaction amount to determine the fee. The FAMS may also determine the fee code in a similar manner. The FAMS may provide the fee code to the FI or core processor.

In other embodiments, the fee amounts may not be stored in the FAMS, and may be stored at the FI instead. In these embodiments, the FAMS may determine the fee code based on the transaction amount, and may provide the fee code to the FI. Responsive to receiving the fee code, the FI may determine the fee amount based on the fee code, and may return the fee amount to the FAMS.

The process 500 may include generating and sending an overdraft allowance notification message to the electronic address of the customer, at 508. The overdraft allowance notification message, and the manner of sending the overdraft allowance notification message, may be as described above with reference to FIG. 3. The overdraft allowance notification message may include a link to an authentication interface of an institution associated with the customer. The link, and the authentication process, may be as described above with reference to FIG. 3.

Referring again to FIG. 5, the process 500 may include, responsive to the customer being authenticated by the authentication interface of the financial institution, providing a user interface to the electronic customer device for display to the customer, at 510. The user interface may display overdraft allowance information for each overdraft allowance event associated with the customer and display elements from which a user may select, including a display element for a payment option. For example, referring again to FIG. 2, the FAMS 204 may provide the user interface to the customer device 208. The user interface may be similar to the user interface of FIG. 4, as described above.

Referring again to FIG. 5, the process 500 may include, responsive to the customer selecting a payment option, generating and sending a payment message, at 512. The processing of the payment message may be as described above with reference to FIG. 3.

Easy Select Dispositioning

The disclosed FAMS presents a variety of transactions and options to customers. Many customers and small businesses don't have time to analyze these transactions and options in detail, but still want an opportunity to select appropriate options for each transaction. Complicating factors include small devices and other time constraints.

In some embodiments, the FAMS provides easy select dispositioning of such items by providing "quick select" buttons as display elements in a user interface. Instead of individually making a decision for each transaction, the customer may select a decision type and select all transactions that apply to that selected decision type. This process is particularly efficient when the number of transactions is large. With this technology, an individual or small businesses operator can implement their decisions in seconds rather than minutes. In some embodiments, the FAMS then automatically groups the transactions by decision type for quick verification of the decisions made.

Figure 6:
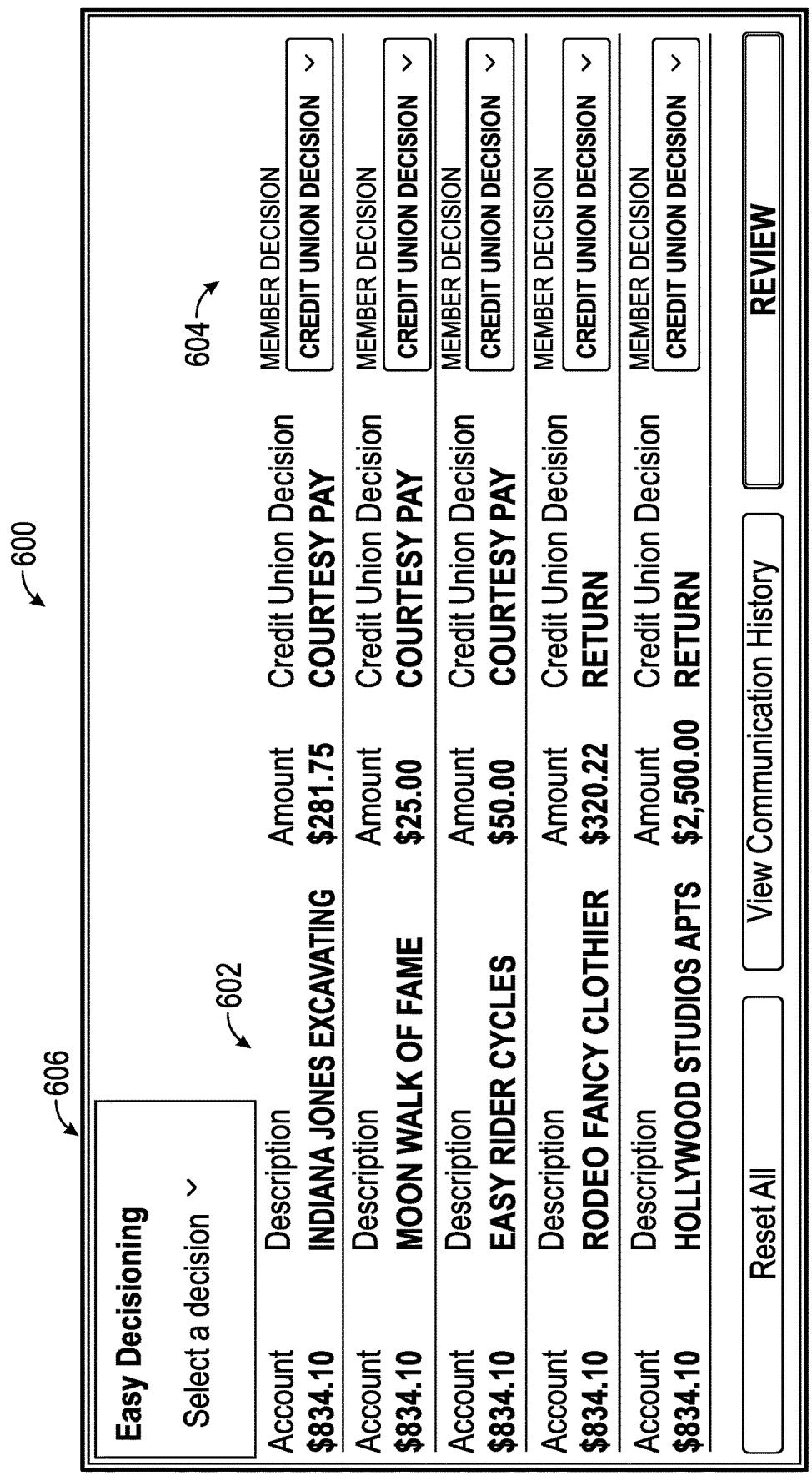
FIG. 6 depicts an example first user interface that may be provided to the customer for easy select dispositioning according to some embodiments of the disclosed technologies.

FIG. 6 depicts an example first user interface 600 that may be provided to the customer for easy select dispositioning according to some embodiments of the disclosed technologies. The user interface 600 may be provided as described above, which may follow the authentication and notification methods described above. Referring to FIG. 6, the user interface 600 may list the items, at 602. The list may include the account number, a description such as the name of the payee, and the amount of the item. The user interface 600 may include a user-operable member decision drop-down menu display element 604 for each item in the list. A user can operate the display elements 604 to make decisions for individual items in the list, as described above. The user interface 600 may also include a user-operable easy decisioning display element, at 606. The customer may operate this display element 606 to select a decision type to be applied to multiple items in the list, for example in order to speed the decisioning process.

FIG. 7 depicts an example second user interface 700 that may be provided to the customer for easy select dispositioning according to some embodiments of the disclosed technologies. Referring to FIG. 7, a customer has operated the easy decisioning display element 606 to select the decision type "I want to pay". Other possible decisions types may include decisions to pay the instrument, to return the instrument to the payee, to report the instrument as fraudulent, or to stop payment of the instrument. After selecting the decision type, the customer may apply the decision type to certain items by selecting those items. Referring to FIG. 7, the selected items are marked with a "P", at 702. Responsive to the customer selections, the FAMS may send an electronic message representing the decisions to the FI, for example as described above.

AI Decisioning Based Upon Previous Activity

Financial institutions have always had a hierarchy of presentment to process debit and credit transactions. This process is rigid and includes assumptions on which transactions a customer (e.g., a consumer or small business) would want to pay.

Up until this time, there has been no way for a financial institution to know or intelligently guess which transactions a customer would want to pay versus defaulting to the rigid established hierarchy. This approach causes dissatisfaction and problems for the customers because items could be dishonored that were critically important for the customers to pay.

In some embodiments, the FAMS may use the previous activity of the customer to select default decisions for the customer's current transactions. For example, the FAMS may maintain a record of which decisions the customer has selected in the past for particular transactions. The FAMS may also maintain a record of what payment methods were used when the customer selected a payment decision.

In some embodiments, the FAMS uses algorithms to build a database of predictable actions to present to the customer. The financial institution's hierarchy becomes obsolete, and the selected default decisions now reflect what the customer has done in the past. This process results in quicker and more accurate decisioning.

In some embodiments, the process may employ artificial intelligence. For example, the process may employ one or more machine learning models. Any machine learning models and techniques may be used. For example, the machine learning models and techniques may include decision trees, neural networks, gradient boosting, and similar machine learning models and techniques. The machine learning models may be trained previously with historical correspondences between decisions made and parameters of the corresponding transactions. The training may be supervised, unsupervised, or a combination thereof, and may continue between operations for the lifetime of the system. The training may continue with use of the models to improve their accuracy over time. The parameters may include, for example and without limitation, the account number, the identity of the payor, the identity of the payee, the amount of the item, the date of the item, the type of payment (e.g., check, ACH, or debit card), and the ultimate decision made on handling the item. Time frames and weights may be assigned to each data point and calculated to determine a pattern of activity.

When a new item is presented, the parameters for the new item may be applied as inputs to the trained model. In response, the model may provide a default decision. The FAMS may present the item, the default decision, and one or more of the parameters to the user in a user interface. This process may follow the authentication and notification procedures described above.

FIG. 8 depicts an example user interface 800 that may be provided to the customer for AI decisioning based upon previous activity according to some embodiments of the disclosed technologies. The user interface 800 may be provided as described above, which may follow the authentication and notification methods described above. Referring to FIG. 8, the user interface 800 may list the items, at 802. The list may include the account number, a description such as the name of the payee, and the amount of the item. The user interface 800 may include display elements 804 that list the automatic decision for one or more of the items. Each display element 804 may include a drop-down menu that allows the customer to change the decision. Responsive to the customer selection or confirmation of the automatic selection, the FAMS may send an electronic message representing the decisions to the FI, for example as described above.

How Much can I Afford Analytics

When presented with multiple items to pay, a customer who does not have sufficient funds to pay all of the items may struggle with understanding how much the customer can afford to pay, which items to pay, and how to pay them. Budget models can sometimes assist the customer, but cannot provide timely and specific answers to these questions. Returning the items can increase the overall cost by imposing additional fees, and can have devastating effects on the customer's credit rating, reputation, and future payment terms.

In some embodiments, the FAMS may provide a calculator tool that provides timely and specific answers. For example, the tool may provide the customer with options for how much the customer can afford to pay to remedy some or all of the items presented. This calculations vary based upon what the financial institution offers and what they want to include in the calculator. The tool is not a budgeting calculator. Rather, the tool is a calculator that assists the customer in discovering and using funds from multiple sources the customer may already have or may be able to obtain. The tool may provide a combination of questions and fill in the blank answer boxes for the customer to complete in order to compute an amount the customer can afford to pay.

Figure 9:
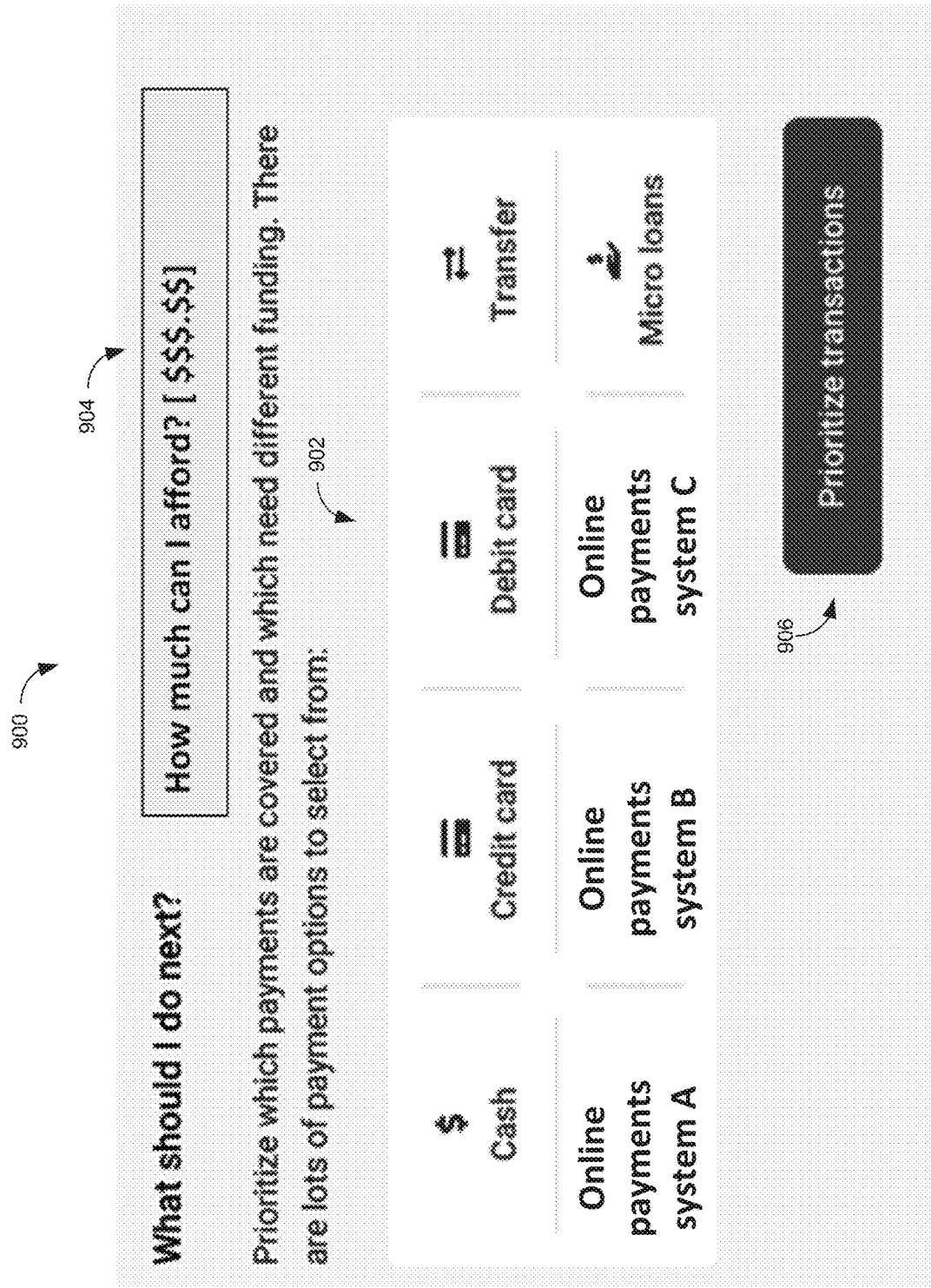
FIG. 9 depicts an example user interface that may be provided to the customer for how much can I afford analytics according to some embodiments of the disclosed technologies.

FIG. 9 depicts an example user interface 900 that may be provided to the customer for the "how much can I afford" analytics according to some embodiments of the disclosed technologies. The user interface 900 may be provided as described above, which may follow the authentication and notification methods described above. The user interface 900 may be presented responsive to the user selecting a user-operable "HOW MUCH CAN I AFFORD?" display element, which may be presented in a user interface listing the items to be paid, for example including one or more of the user interfaces described above.

Referring to FIG. 9, the user interface 900 may list multiple funding sources, at 902. For example, the sources may include cash, credit cards, debit cards, monetary transfers from accounts at other financial institutions, online payments systems, micro loan service, and similar funding sources. Customers may not be aware of payment resource options or how to use them. The system not only presents these options but allows the customers to access them within the technology. Microloan applications may be embedded in the technology for an additional resource if the customer does not have cash, other available funds, or available credit on a card. As the customer adds funding sources, a dollar amount representing the total amount the customer can afford to pay based on those sources, and the customer's account at the financial institution, may be displayed, at 904.

A user-operable "Prioritize transactions" display element 906 allows a customer can change the order of presentment that the financial institution has selected. By allowing the customer to reprioritize or reorder the transactions, they may be able to pay the transactions they believe are most important and return others that are not as critical. In some cases, no additional funds are needed.

How Much Did I Save Analytics

In a world of charges and negative consequences, it is helpful to show the customer how much they saved by taking particular actions. However, these savings are difficult to calculate, especially when it comes to transactions being presented that have caused an overdrawn account. Furthermore, the amount that is estimated as savings for each transaction may vary due to the type of transaction and the timing. Techniques for this estimation are particularly difficult or even non-existent when it comes to non-sufficient funds and overdraft (NSF/OD) items.

Figure 10:
FIG. 10 depicts an example user interface that may be provided to the customer by the savings estimate tool according to some embodiments of the disclosed technologies.

In some embodiments, the FAMS provides a savings estimate tool to estimate how much the customer saved. FIG. 10 depicts an example user interface 1000 that may be provided to the customer by the savings estimate tool according to some embodiments of the disclosed technologies. The user interface 1000 may be provided as described above, which may follow the authentication and notification methods described above. Referring to FIG. 10, the user interface 1000 may list the presented items, and for each item may prompt the customer to answer certain questions. The savings estimate tool also features a novel processing backend that estimates the amount of savings based on the answers provided by the customer.

In one example, the tool may determine the payee for each item, for example by processing an image of the item. Based on the payee, the tool may then ask the purpose of the item (e.g., rent payment, mortgage payment, credit card payment, or auto loan payment). Based on the purpose, the tool may estimate the savings. The estimated savings may include priority returned item fees, late fees, restocking fees, insurance reactivation fees, collection fees, phone reactivation fees, and similar fees.

Many retail receipts list sales discounts based upon the original price. When these transactions are presented as NSF/OD items, the savings can be difficult to determine. Currently these savings are estimated based upon industry standards and the most likely costs. The savings estimate tool instead asks the customer questions to make this determination.

In a similar manner, the tool may consider late fees or restocking charges for returned merchandise. Currently these charges are estimated as a percentage of the payment. The savings estimate tool instead asks the customer questions to make this determination.

The tool may consider the type of transaction when estimating the savings. For example, for a returned item, the tool may presume an industry standard returned item fee, for example such as $25.00.

FIG. 11 depicts an example user interface 1100 that may be provided to the customer for how much did I save analytics according to some embodiments of the disclosed technologies. The user interface 1100 may be provided as described above, which may follow the authentication and notification methods described above. The user interface 1100 may be presented responsive to the user selecting a user-operable "HOW MUCH DID I SAVE?" display element, which may be presented in a user interface listing the items to be paid, for example including one or more of the user interfaces described above. Referring to FIG. 11, the user interface 1100 may provide a total summary recap of estimated savings based upon decisions selected by the user on the user interface 1000 of FIG. 10.

Real-Time Cashier's Check Anti-Fraud Tool

Cashier's checks are prepaid bank checks that customers purchase and use, typically for large transactions like loan closings or purchasing large dollar items. Banks and merchants trust cashier's checks will be paid because they are prepaid by the customer. However, cashier's checks are sometimes fraudulent. Currently there is no way to determine whether a cashier's check is fraudulent. Banks and merchants generally accept cashier's checks in good faith hoping they are not fraudulent. But currently no technological solution exists to "confirm" or "guarantee" a cashier's check is good until it has cleared the bank.

In some embodiments, the FAMS may provide a real-time cashier's check anti-fraud tool that leverages financial institution data to validate a cashier's check is genuine before it is accepted. Users of this technology have the unique advantage of a central hub that validates certain criteria when a cashier's check is scanned or input into the FAMS. Parameters used by the FAMS to validate a cashier's check may include the date, routing number, account number, check number, amount, and payee. Through secure data lines, the FAMS may validate the check data by connecting to a variety of systems including core systems, positive pay systems, accounting systems and other systems where the cashier's check data is maintained.

Figure 12:
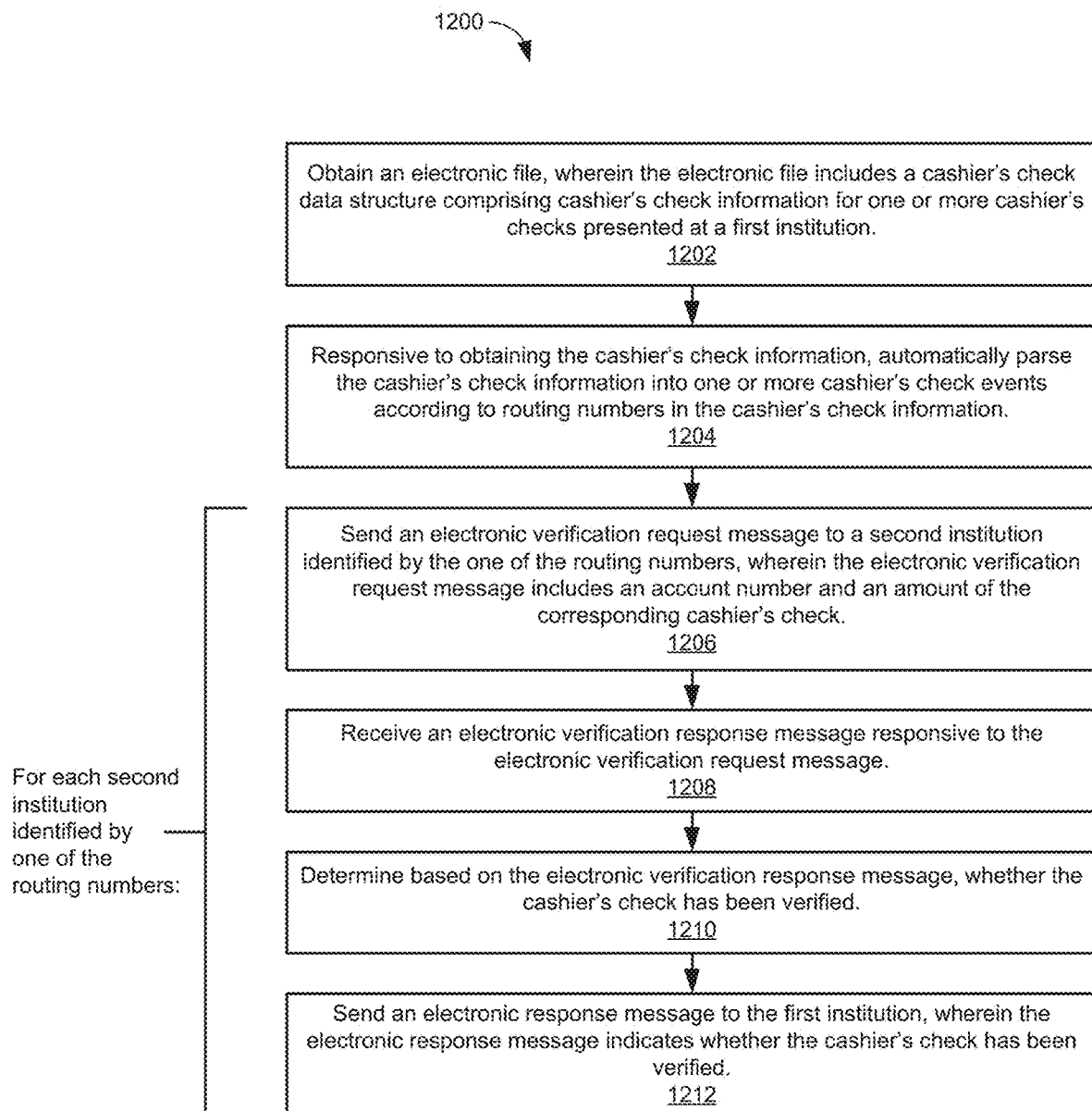
FIG. 12 is a flowchart illustrating a process for the real-time cashier's check anti-fraud tool according to some embodiments the disclosed technologies.

FIG. 12 is a flowchart illustrating a process 1200 for the real-time cashier's check anti-fraud tool according to some embodiments the disclosed technologies. The process 1200 is described with reference to FIGS. 2 and 12, and may be executed by the FAMS 204 of FIG. 2.

Referring to FIG. 12, the process 1200 may include obtaining an electronic file, at 1202. The electronic file may include a cashier's check data structure comprising cashier's check information for one or more cashier's checks presented at a first institution. For example, the tool may provide a user interface to an electronic device at the institution. The user interface may include a display element that allows a user at the institution to enter the cashier's check information for the one or more cashier's check presented at the first institution. In some embodiments, the user may enter the information manually, and the file includes the entered information. In some embodiments, the user may simply scan the check, and the file may include an image of the check. The electronic file, and the manner of obtaining the electronic file, may be as described above with reference to FIG. 3.

Referring again to FIG. 12, the process 1200 may include, responsive to obtaining the cashier's check information, automatically parsing the cashier's check information into one or more cashier's check events according to routing numbers in the cashier's check information, at 1204. After this parsing, the process 1200 may include one or more of the operations that follow for one or more of the customers.

The process may include identifying a second institution based on the routing number. For example, the second institution may be the issuer or payor of the cashier's check, a core processor, or a similar institution. The process may include determining whether the second institution supports the anti-fraud tool. If not, the tool may send a message to the first institution indicating that the second institution is not a participating financial institution.

But if the second institution supports the anti-fraud tool, the process 1200 may include sending an electronic verification request message to the second institution, at 1206. The electronic verification request message may include one or more of an account number, and an amount, a date, a check number, and a payee of the corresponding cashier's check. Messages may be exchanged with the institutions by accessing application programming interfaces (APIs) of the institutions.

The process 1200 may include receiving an electronic verification response message responsive to the electronic verification request message, at 1208. The process 1200 may include determining, based on the electronic verification response message, whether the cashier's check has been verified, at 1210.

The process 1200 may include sending an electronic response message to the institution, wherein the electronic response message indicates whether the cashier's check has been verified, at 1212. For example, the tool may provide a user interface to an electronic device at the institution. The user interface may include a display element that indicates whether the cashier's check has been verified based on the electronic response message.

Real-Time Fraudulent Item Reporting Tool

Occasionally fraudulent items are presented to a customer's account for payment. A common example is the fraudulent check. Currently it is not possible for a customer to detect and report the fraudulent item in a real-time or even timely manner, for several reasons. Some processing methods do not post an item to a customer's account until after the 24-hour window for returning the item has closed. As a result, the customer does not see the item until it is too late to return it within the 24-hour window. Even if a processing system posts the item to the customer's account within the 24-hour window, often no notification is provided to the customer to allow for timely review of the item(s). And even if the customer has configured such notifications, the customer still must review the items, determine whether they are fraudulent, manually notify the financial institution, complete the required paperwork, and manually return the item, all within the 24-hour return window.

As a consequence, a customer may not learn of a fraudulent item until days later. The customer must then deal with the negative consequences because the unanticipated item was paid with the customer's available balance. Furthermore, paying the item may cause other items to be returned, for example due to insufficient funds in the customer's accounts. Such returns may degrade the customer's relationships with merchants, and may result in additional fees being charged to the customer by third parties, for example such as return check fees, late fees, restocking fees, and poor payment terms going forward.

Financial institutions may suffer adverse consequences as well. These institution may be required to reimburse the customer and pay other items that were fraudulent because the institution did not learn of the fraudulent item until it was too late. For example, the customer's financial institution, which accepted the fraudulent item for deposit (i.e., the payee financial institution), may be unaware the item is being returned. This causes losses on the payee financial institution side. If the item is returned as fraudulent, the payee bank must charge the item back to the customer that made the deposit. If the customer does not have a sufficient balance to cover the returned item, they will be overdrawn until and unless they can pay back the fraudulent funds they have already used.

In some embodiments, the FAMS provides a real-time fraudulent item reporting tool that allows the customer to indicate that an item being presented will create an overdraft, is a fraudulent item, can be returned within the 24-hour return window of opportunity. This tool not only notifies the customer of specific items causing an overdrawn situation, but also provides an option to "report fraud" directly in the user experience. The item is immediately flagged to be returned with no action needed on the financial institution's part, aside from documenting the customer's report of fraud or unauthorized activity. The tool allows a customer to stop a problem before it happens. And the payor's financial institution can avoid fraud losses due to late returns.

In addition, if the payee's bank supports the tool, the FAMS immediately notifies the payee's financial institution that the item is being returned. Normally this notification process takes a minimum of 24 hours, and occurs only when the item is over a certain dollar amount. Currently there are no 24-hour notifications required for smaller items. The FAMS notification allows the payee financial institution to take action quickly to preserve the funds in the payee's account to pay the charge back when it arrives, thereby mitigating additional losses.

Figure 13:
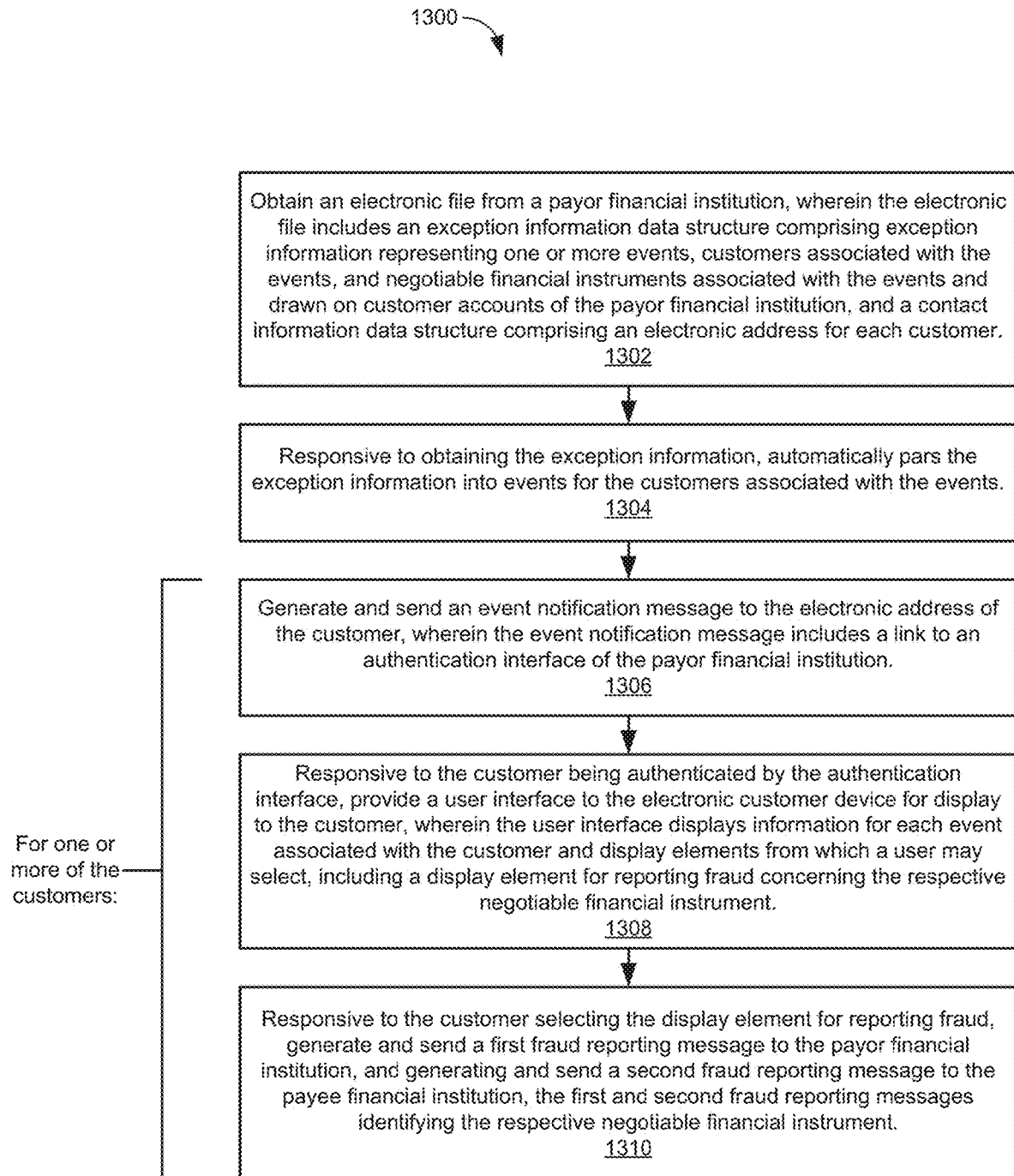
FIG. 13 is a flowchart illustrating a process for the real-time fraudulent item reporting tool according to some embodiments the disclosed technologies.

FIG. 13 is a flowchart illustrating a process 1300 for the real-time fraudulent item reporting tool according to some embodiments the disclosed technologies. The process 1300 is described with reference to FIGS. 2 and 13, and may be executed by the FAMS 204 of FIG. 2.

Referring to FIG. 13, the process 1300 may include obtaining an electronic file from a first institution, at 1302. The electronic file may include an exception information data structure comprising exception information representing one or more events, customers associated with the events, and negotiable financial instruments associated with the events and drawn on customer accounts of the payor financial institution, and a contact information data structure comprising an electronic address for each customer. The electronic file, and the manner of obtaining the electronic file, may be as described above with reference to FIG. 3.

The process 1300 may include, responsive to obtaining the exception information, automatically parsing, by the computer processor, the exception information into events for the customers associated with the events, at 1304. After this parsing, the process 1000 may include one or more of the operations that follow for one or more of the customers.

The process 1300 may include generating and sending, by the computer processor, an event notification message to the electronic address of the customer, wherein the event notification message includes a link to an authentication interface of the payor financial institution, at 1306.

The process 1300 may include responsive to the customer being authenticated by the authentication interface, providing, by the computer processor, a user interface to the electronic customer device for display to the customer, at 1308. The user interface may display information for each event associated with the customer and display elements from which a user may select, including a display element for reporting fraud concerning the respective negotiable financial instrument.

The process 1300 may include, responsive to the customer selecting the display element for reporting fraud, generating and sending a first fraud reporting message to the payor financial institution and a second fraud reporting message to the payee financial institution, at 1310. The first and second fraud reporting messages may identify the respective negotiable financial instrument.

FIG. 14 depicts an example user interface 1400 that may be provided to the customer by the real-time fraudulent item reporting tool according to some embodiments of the disclosed technologies. The user interface 1400 may be provided as described above, which may follow the authentication and notification methods described above. Referring to FIG. 14, the user interface 1400 may list the items, at 1402. The list may include the account number, a description such as the name of the payee, and the amount of the item. The user interface 1400 may include display elements 1404 that list the FI decisions for the items. The user interface 1400 may include user-operable display elements 1406 that also list the FI decisions for the items. Each display element 1406 may provide the options, for example, through a drop-down menu or other user-operable display elements that allow the customer to change the decision. In the example of FIG. 14, the customer has operated the drop-down menu for the first listed item to indicate it is fraudulent, at 1408.

Real-Time Debit Card Automated Opt-In Process

When a customer attempts to pay with a debit card but funds in the card account are insufficient to cover the transaction, the transaction will be declined. Many debit cards address this shortcoming by allowing a customer to "opt-in" to a debit card overdraft allowance service. If the customer has opted-in, the debit card transaction will be paid with an overdraft allowance. However, many customers don't opt-in due to the fear of overdraft fees being assessed. And because debit card transactions are so convenient, customers often don't carry checks or cash as an alternative payment method. Then if a debit card transaction is declined, the customer has no other source of payment. This can be a significant problem, for example, for a customer stuck at a grocery store or gas station without a source to pay. Furthermore, the debit card authorization process is so fast (on the order of nano-seconds) there is no time to route the transaction differently or notify the customer of the option to change the "opt-out" status of the debit card.

In some embodiments, the FAMS provides a real-time debit card automated opt-in process. In these embodiments, the FAMS may provide FIs with an option to "turn-on" this service. The technology is integrated into the card system, and triggers a flag when a debit card transaction is declined. This flag is sent to the FAMS, which in response sends a message notifying the customer the transaction has been declined due to the "opt-out" status of the card. The message may be sent by SMS, email, or a similar service. A customer wishing to "opt-in" may respond to the message. The response is received by the FAMS. Once the message is received, the FAMS sends a Reg E "Opt-In" field maintenance to the core system. Once the field is updated on the core system, the customer may try the transaction again for approval.

Figure 15:
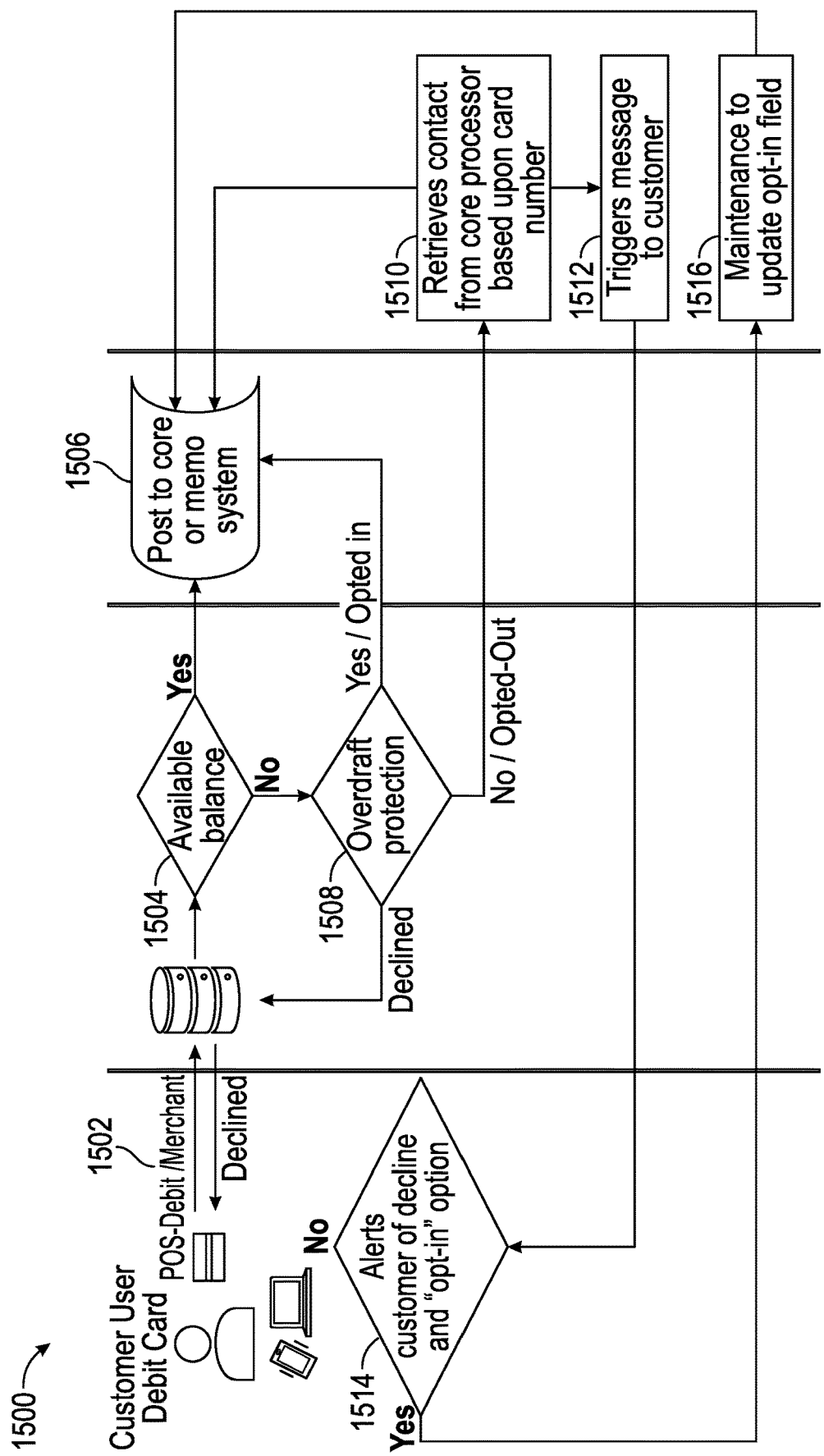
FIG. 15 is a flowchart illustrating a debit card automated opt-in process according to some embodiments the disclosed technologies.

FIG. 15 is a flowchart illustrating a debit card automated opt-in process 1500 according to some embodiments the disclosed technologies. But while described in terms of debit cards, the disclosed technology is readily applicable to accounts having similar "opt-in" features.

Referring to FIG. 15, a customer uses a debit card to pay a point-of-sale (POS) transaction, at 1502. If the available balance of the debit card account is sufficient, at 1504, the transaction may be posted to the core or memo system, at 1506, and is successfully completed. But if the available balance of the debit card account is not sufficient, at 1504, it may be determined whether the customer has opted-in to an overdraft protection service, at 1508. If the customer has opted-in to the overdraft protection service, the transaction may be posted to the core or memo system, at 1506, and may be successfully completed.

But if the customer has not opted-in to an overdraft protection service, or has opted-out of the service, the transaction may be declined, and the FAMS may retrieve contact information from the core processor, for example based on the debit card account number, at 1510, and may trigger an electronic message to be sent to the customer, at 1512. The message may alert the customer of the declined transaction and the opt-in status of the debit card, and may provide the customer with an option to change the opt-in status, at 1514. For example, the message may provide a user interface on the customer's smartphone having display elements that allow the customer to change the opt-in status. Responsive to the customer changing the opt-in status, the FAMS may send a Reg E "Opt-In" field maintenance message to the core system to update the opt-in status for the debit card account, at 1516. The customer may then try the transaction again.

ACH Warehouse Analytics for Payments

The Automated Clearing House (ACH) system utilizes a warehouse, referred to herein as "the ACH warehouse", to store credits and debits until the date each entry should be posted. Financial institutions use the ACH warehouse to store ACH entries, but do not provide any information to their customers as to what is staged to post next. This service has not been a part of financial institution processes and as a result, their customers are not aware of impending ACH activity.

In some embodiments, the FAMS provides ACH warehouse analytics. The FAMS may connect to a financial institution's ACH warehouse and detect transactions that are pending to post within the 24-hour window available for returns. The FAMS then provides this crucial information to the customer in a user interface so the customer can take action items within the 24-hour window, including overdrafts as well as ability to pay items. If the customer has credits in the ACH warehouse that have a posting date within the 24-hour window, the FAMS may display this information to the customer in the user interface to inform the customer of the impending deposit. This information is helpful when the customer is selecting methods to pay for items selected by the customer for payment.

Figure 16:
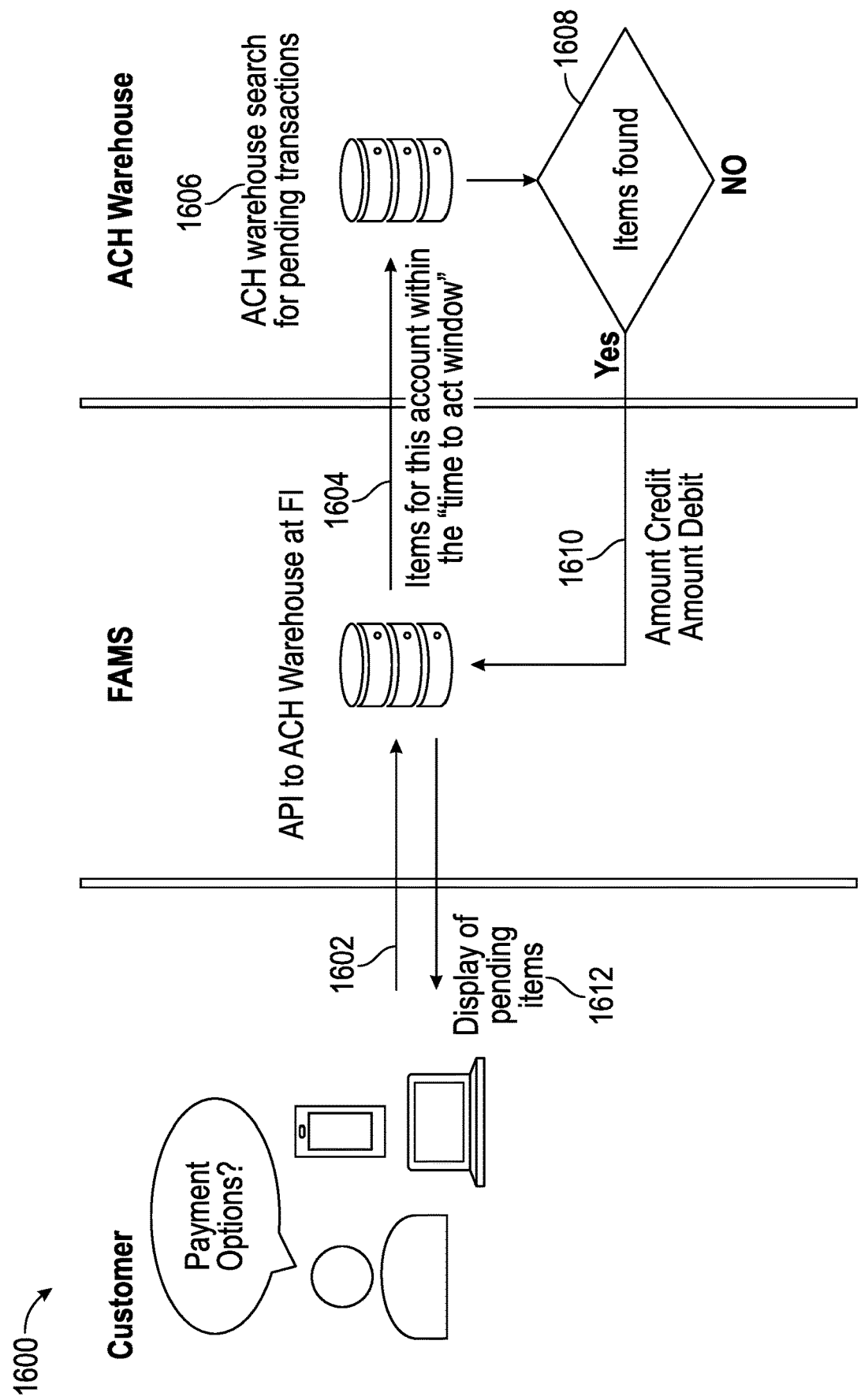
FIG. 16 is a flowchart illustrating a process for providing ACH warehouse analytics according to some embodiments the disclosed technologies.

FIG. 16 is a flowchart illustrating a process 1600 for providing ACH warehouse analytics according to some embodiments the disclosed technologies. Referring to FIG. 16, a customer may employ a FAMS user interface to request ACH warehouse analytics, at 1602. FIG. 17 depicts an example user interface 1700 a customer may employ to request ACH warehouse analytics according to some embodiments of the disclosed technologies. The user interface 1700 may be provided as described above, which may follow the authentication and notification methods described above. Referring to FIG. 17, the user interface 1700 may present multiple scenarios for customer selection, In the example of FIG. 17, the scenarios include a scenario where the customer does not have extra funds, where the customer can pay for the items, and where the customer has money elsewhere.

Responsive to the request, the FAMS may send a query to the ACH warehouse, at 1604. The FAMS may access the ACH warehouse using an API provided by the warehouse. Responsive to the query, the ACH warehouse may search its database for pending transactions, at 1606. If any items are found, at 1608, the ACH warehouse may provide information describing the items to the FAMS, at 1610. In response, the FAMS may provide the information to the customer in a user interface, at 1612.

FIG. 18 depicts an example user interface 1800 that may be provided to the customer by the real-time fraudulent item reporting tool according to some embodiments of the disclosed technologies. The user interface 1800 may be provided as described above, which may follow the authentication and notification methods described above. Referring to FIG. 18, the user interface 1800 may list details concerning future and pending transactions.

Automated GL Reconcilement

When transactions occur outside of the core processor, it is difficult so provide any automation due to the access levels needed as well as the correct transaction sets to customer accounts and general ledgers (GLs). These challenges are increased because the financial institution does not allow other outside vendors to post entries to their customer accounts or their GLs. Due to restrictive and prohibited access, these processes are not provided by outside vendors.

In some embodiments, the FAMS provides an automated GL reconcilement service. The FAMS technology is integrated with the financial institution's core processor. The FAMS also conforms to many of the financial audit and security requirements that the financial institution must follow. As a result, the FAMS may launch certain processes that are internal to the core processor. These processes include customer transactions, various GL transactions, and updating return codes, based upon customers' changes throughout the day. These processes can be different based upon the processing hierarchy as well.

One such process is the customer transactions process. When the customer selects "Pay with Cash" or "Pay with Available Balance", the funds must be preserved by placing a hold on the customer's account. This ensures that the funds won't be used for other purposes, for example such as debit card transactions. When a customer selects "Pay with Credit Card", the merchant approved amount goes to a merchant settlement account rather than posting to the customer's account, again to preserve the funds until the items are paid.

Other processes include GL transactions. GL transactions include fees, merchant services and interchange. Certain GL processes are triggered based upon each transaction. These GL processes are established by the financial institution, but the FAMS works to establish the miscellaneous job post after the time to act has expired. These GL entries move funds into the proper GL and customer accounts to create an automated settlement process for the financial institution so manual transactions do not need to be posted.

Another process is updating return codes. This process is a critical part of the "end of day" processing. The default decisions that occurred based upon the financial institution's hierarchy posting process need to be updated based upon the customer decisions throughout the time to act. This process does one of several things for each item, for example including: remove the item from the "Return file" so it can pay; add the item to the "Return file" so it will be returned; or change the return code to reflect the reason for return if it is other than NSF (e.g., in the case of fraud, stop pay). Other pre-established return codes may be used.

Figure 19:
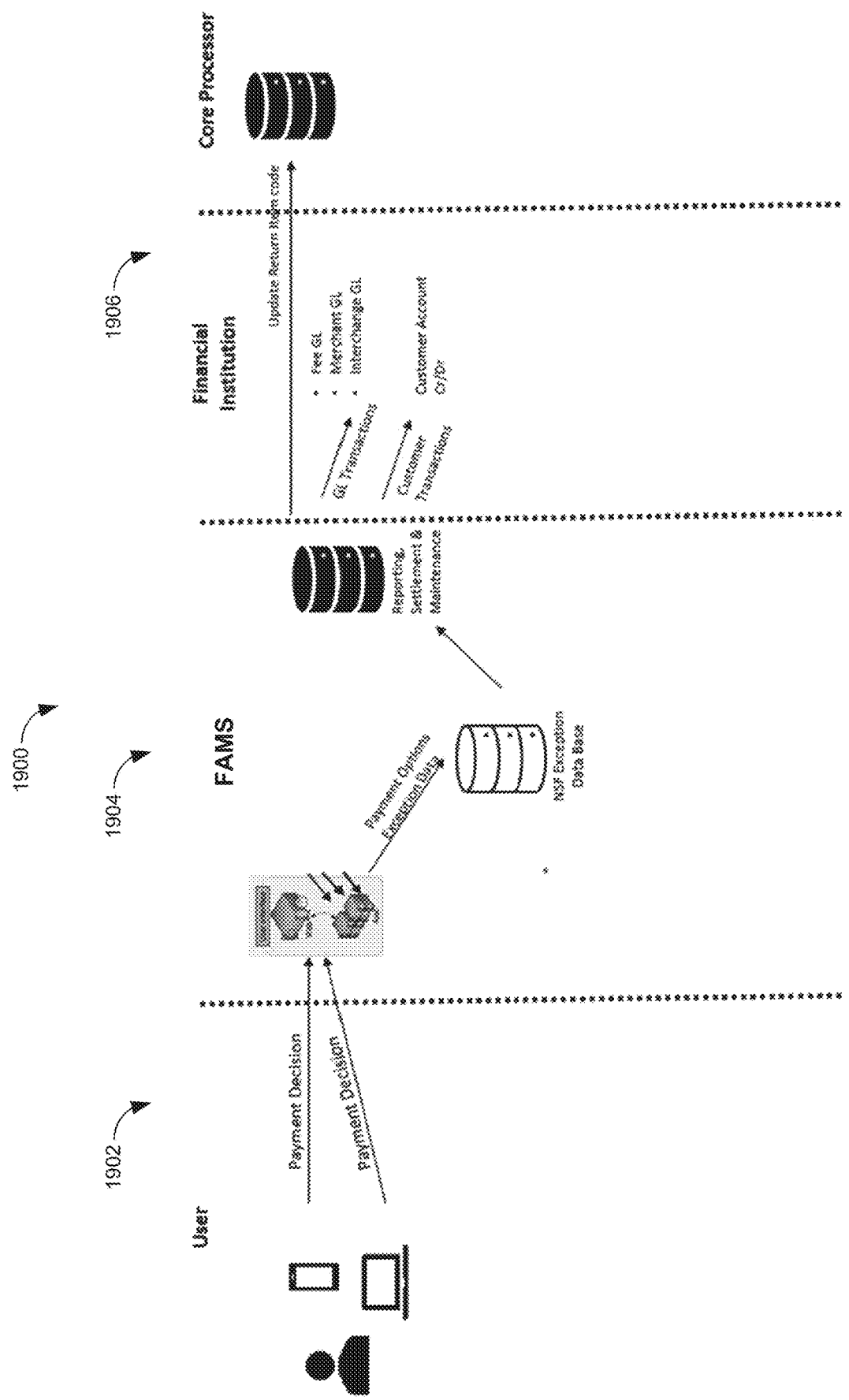
FIG. 19 is a flowchart illustrating a process for automated GL reconcilement according to some embodiments the disclosed technologies.

FIG. 19 is a flowchart illustrating a process 1900 for automated GL reconcilement according to some embodiments the disclosed technologies. FIG. 19 shows the process flow from left to right. Once the customer has made their selections of pay, return, or report fraud, at 1902, the system is updated in the FAMS data base and queued to post once the "time to act" has expired, at 1904. At that time transactions are triggered based upon the customer decisions including all fees collected, as well as merchant account authorized transactions. At this time, any account holds placed to preserve the funds designated for these transactions are released and items are paid through the account. In addition to this process, return, paid, fraud and stop payment codes are updated on the return file to balance to the transactions processed. The establish GLs are affected by the corresponding transaction amounts including service charges, convenience fees and merchant settlement (for card transactions). The return file for the FI is updated with changes made by the customers including removal of items that were paid, fraudulent items and stop payments, at 1906. All other items on the return file remain as they were.

Automated FAMS Administration (AFA)

In some embodiments, the FAMS provides an automated FAMS administration (AFA) tool. The AFA tool enables the onboarding into the FAMS of multiple financial institutions at once, and provides a mechanism to allow each financial institution to set up some of their key data, for example such as fee structures, settings, and messaging. The AFA tool is a split process between the technical specifications for each financial institution and the financial institution data that is specifically based upon their business decisions.

The financial institution part may be mostly exposed to the financial Institution based upon an administrative role for access to the AFA tool. This information may automatically be uploaded to the designated FAMS "tenant" (e.g., financial institution) once submitted. Certain configurable data points may be open for maintenance by credentialed financial institution employees.

Data points for each financial institution may include: service charge fee, convenience fee ($/%), business rules based upon various criteria, messaging, branding (Colors/logo), return item codes, NSF/OF fee refund matrix, general ledgers for settlement, time zone, web site, main phone number, group fraud email, name of courtesy pay program, name of contact center, customer portal start of day time, end of day time, mission control portal start of day, end of day, discount on service charge, holiday schedule, business day schedule, billing address, and billing contact.

Data points for the technical team may include: Member portal; URL, Okta client ID—Mission Control; URL, Okta client OD, group ID—Credit Union; Core API, transaction API, Data base connection string, and Data Base name—Sendgrid; API Key, from email, URL, from name—Twillio; SID Token, phone—Payment Detail; Secret key, access key, public profile—ServiceBus Endpoint—Azure storage account detail; Storage account endpoint, blob path from where ETL triggers—SFTP Details; Host, Port, Username, password, path—Decision codes; ACH pay, fraud, Draft, Pay, fraud.

Roles for the AFA tool may include role name and role description. Configurations may include financial information, convenience fee threshold, transaction fee threshold, FAMS fee threshold, admin email, and IDP configuration.

The AFA tool also includes sections that display: dashboards, corporate set-ups users, tenants, and settings. Other data fields may added as requirements change by financial institution, for example including specific messaging throughout the technology, processing codes (e.g. GL codes, return codes, and similar codes) discounts, business rule criteria, and analytics.

Customer Settings

Currently financial institutions do not provide customer settings for customers to configure their interfaces and processes to be more convenient for daily use, and that provide enough flexibility to create settings that fit the customer's financial and daily needs. Without these settings, the customer has no power to establish alerts, payment setups, auto decisioning, or other processing that make the technology more convenient and easier to use.

In some embodiments, the FAMS exposes these customer settings to the customer. The customer settings may be specific to each customer, and may allow certain processes to be established to automatically assist the customer. These settings may be configured by the customer, and may be saved by the customer until updated. Example settings include alert timing, secondary alerts, preferred payment methods, automatic decisioning on certain types of payments, amount warnings, payee suspect warnings, overdraft allowance warnings, communication preferences, updated contact information, life line template set up, and nicknaming accounts. Because the FAMS works "inside the vault door" (after customer authentication has occurred), these settings are considered safe relative to the preapproved financial institutions' authentication processes, and can be updated to the core system the financial institution uses.

Job Notifications

Job sites are everywhere and easily accessible. However, in the financial institution world, job availability notifications have never been part of financial institution offers even though they would be of huge benefit to consumers, especially those with financial issues. Constant notifications of jobs available would be helpful and convenient to those that are struggling financially.

In some embodiments, the FAMS provides such job notifications. By offering job notifications through a convenient and recognized portal where customers do banking today, the FAMS allows customers a "one-stop" financial area to address all of their financial needs. Online banking is the main financial institution tool used by consumers and small businesses. Since the job notification tab is inside the online banking tab, it is convenient for consumers to see what local jobs are available while conducting online banking.

The FAMS may use algorithms and rules to determine what jobs are available based upon criteria that is gathered by activity in a customer's checking account, and responses to activity concerning overdraft/NSF items. This criteria may include past titles and employers, location, and legal age to work. In addition, the FAMS may pull together job notifications posted on various sites to display in one place jobs that appear to match jobs held historically by the consumer. These data points along with weighted scores may be used to calculate the jobs best suited for each customer. The FAMS may also provide the customer with the ability to expand the search by providing additional information. In some embodiments, this additional information is not maintained by the FAMS.

Figure 20:
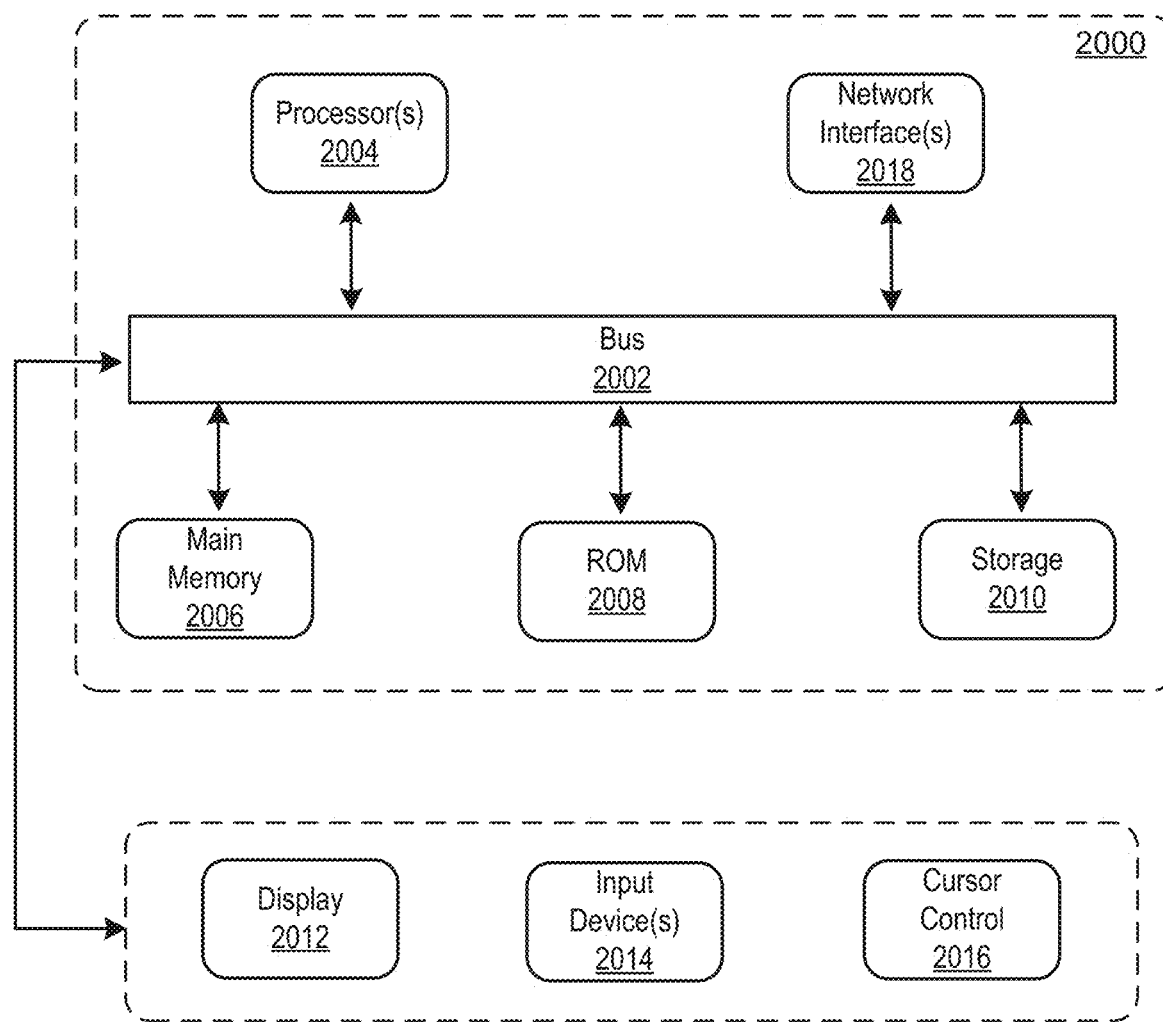
FIG. 20 is an example computing component that may be used to implement various features of embodiments described in the present disclosure.

FIG. 20 depicts a block diagram of an example computer system 2000 in which embodiments described herein may be implemented. The computer system 2000 includes a bus 2002 or other communication mechanism for communicating information, one or more hardware processors 2004 coupled with bus 2002 for processing information. Hardware processor(s) 2004 may be, for example, one or more general purpose microprocessors.

The computer system 2000 also includes a main memory 2006, such as a random access memory (RAM), cache and/or other dynamic storage devices, coupled to bus 2002 for storing information and instructions to be executed by processor 2004. Main memory 2006 also may be used for storing temporary variables or other intermediate information during execution of instructions to be executed by processor 2004. Such instructions, when stored in storage media accessible to processor 2004, render computer system 2000 into a special-purpose machine that is customized to perform the operations specified in the instructions.

The computer system 2000 further includes a read only memory (ROM) 2008 or other static storage device coupled to bus 2002 for storing static information and instructions for processor 2004. A storage device 2010, such as a magnetic disk, optical disk, or USB thumb drive (Flash drive), etc., is provided and coupled to bus 2002 for storing information and instructions.

The computer system 2000 may be coupled via bus 2002 to a display 2012, such as a liquid crystal display (LCD) (or touch screen), for displaying information to a computer user. An input device 2014, including alphanumeric and other keys, is coupled to bus 2002 for communicating information and command selections to processor 2004. Another type of user input device is cursor control 2016, such as a mouse, a trackball, or cursor direction keys for communicating direction information and command selections to processor 2004 and for controlling cursor movement on display 2012. In some embodiments, the same direction information and command selections as cursor control may be implemented via receiving touches on a touch screen without a cursor.

The computing system 2000 may include a user interface component to implement a GUI that may be stored in a mass storage device as executable software codes that are executed by the computing device(s). This and other components may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 2000 may implement the techniques described herein using customized hard-wired logic, one or more ASICs or FPGAs, firmware and/or program logic which in combination with the computer system causes or programs computer system 2000 to be a special-purpose machine. According to one embodiment, the techniques herein are performed by computer system 2000 in response to processor(s) 2004 executing one or more sequences of one or more instructions contained in main memory 2006. Such instructions may be read into main memory 2006 from another storage medium, such as storage device 2010. Execution of the sequences of instructions contained in main memory 2006 causes processor(s) 2004 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 2010. Volatile media includes dynamic memory, such as main memory 2006. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 2002. Transmission media can also take the form of acoustic or light waves, such as those generated during radio-wave and infra-red data communications.

The computer system 2000 also includes a communication interface 2018 coupled to bus 2002. Network interface 2018 provides a two-way data communication coupling to one or more network links that are connected to one or more local networks. For example, communication interface 2018 may be an integrated services digital network (ISDN) card, cable modem, satellite modem, or a modem to provide a data communication connection to a corresponding type of telephone line. As another example, network interface 2018 may be a local area network (LAN) card to provide a data communication connection to a compatible LAN (or a WAN component to communicate with a WAN). Wireless links may also be implemented. In any such implementation, network interface 2018 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 2018, which carry the digital data to and from computer system 2000, are example forms of transmission media.

The computer system 2000 can send messages and receive data, including program code, through the network(s), network link and communication interface 2018. In the Internet example, a server might transmit a requested code for an application program through the Internet, the ISP, the local network and the communication interface 2018.

The received code may be executed by processor 2004 as it is received, and/or stored in storage device 2010, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, or a combination of hardware and software. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 2000.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A system for providing alert management and real-time remediation, the system comprising:
    one or more hardware processors; and
    a non-transitory machine-readable storage medium encoded with instructions executable by the one or more hardware processors to perform operations comprising:
    obtaining an electronic file, wherein the electronic file includes an exception information data structure comprising exception information representing one or more events, customers associated with the events, and negotiable financial instruments associated with the events and drawn on customer accounts of a payor financial institution, and a contact information data structure comprising electronic addresses for the customers;
    responsive to obtaining the exception information, automatically parsing the exception information into events for the customers associated with the events; and
    for at least one of the customers:
        determining, for an event associated with the at least one of the customers, a time interval during which the at least one of the customers may remedy the event, wherein the event is associated with a first negotiable financial instrument, wherein a monetary amount of the first negotiable financial instrument exceeds an available monetary balance of a financial account of the at least one of the customers on which the first negotiable financial instrument is drawn;
        generating and sending an event notification message to the electronic address of the at least one of the customers, wherein the event notification message includes a link to an authentication interface of the payor financial institution;
        determining whether to present an option to pay a service fee and an amount due by which the monetary amount the first negotiable financial instrument exceeds the available monetary balance of the financial account of the at least one of the customers using a trained machine learning model that has been trained using unsupervised training with historical correspondences between decisions to present options to pay and parameters of corresponding negotiable financial instruments;
        responsive to the at least one of the customers being authenticated by the authentication interface, providing a first user interface to an electronic customer device for display to the at least one of the customers, wherein the first user interface displays information for events associated with the at least one of the customers and display elements from which a user may select, including an indication of the time interval during which the at least one of the customers may remedy the event, an identification of the first negotiable financial instrument with the service fee and the amount due, a display element for reporting fraud concerning the first negotiable financial instrument, and when it is determined to present the option to pay, the option to pay the amount due;
        responsive to the at least one of the customers selecting the display element for reporting fraud, generating and sending a first fraud reporting message to the payor financial institution, and generating and sending a second fraud reporting message to a corresponding payee financial institution, the first and second fraud reporting messages identifying the first negotiable financial instrument; and responsive to expiration of the time interval:
generating a second user interface for display to the at least one of the customers that provides an indication of the expiration of the time interval in the second user interface, and disabling or removing the option to pay the amount due.

2. The system of claim 1, wherein the events represent non-sufficient funds (NSF) events in financial accounts of customers of the payor financial institution.

3. The system of claim 2, the operations further comprising:
responsive to the at least one of the customers selecting the displayed negotiable financial instrument and the option to pay, displaying multiple payment methods; and responsive to the at least one of the customers selecting the one of the payment methods, initiating a payment to the financial account according to the selected payment method.

4. The system of claim 1, the operations further comprising:
processing one or more rules to determine at least one of the service fee and the time interval.

5. A non-transitory machine-readable storage medium encoded with instructions executable by one or more hardware processors of a computing component for providing alert management and real-time remediation, the machine-readable storage medium comprising instructions to cause the one or more hardware processors to perform operations comprising:
obtaining an electronic file, wherein the electronic file includes an exception information data structure comprising exception information representing one or more events, customers associated with the events, and negotiable financial instruments associated with the events and drawn on customer accounts of a payor financial institution, and a contact information data structure comprising electronic addresses for the customers;

responsive to obtaining the exception information, automatically parsing the exception information into events for the customers associated with the events; and
for at least one of the customers:
determining, for an event associated with the at least one of the customers, a time interval during which the at least one of the customers may remedy the event, wherein the event is associated with a first negotiable financial instrument, wherein a monetary amount of the first negotiable financial instrument exceeds an available monetary balance of a financial account of the at least one of the customers on which the first negotiable financial instrument is drawn;

generating and sending an event notification message to the electronic address of the at least one of the customers, wherein the event notification message includes a link to an authentication interface of the payor financial institution;

determining whether to present an option to pay a service fee and an amount due by which the monetary amount the first negotiable financial instrument exceeds the available monetary balance of the financial account of the at least one of the customers using a trained machine learning model that has been trained using unsupervised training with historical correspondences between decisions to present options to pay and parameters of corresponding negotiable financial instruments;

responsive to the at least one of the customers being authenticated by the authentication interface, providing a first user interface to an electronic customer device for display to the customer, wherein the first user interface displays information for events associated with the customer and display elements from which a user may select, including an indication of the time interval during which at least one of the customers may remedy the event, an identification of the first negotiable financial instrument with the service fee and the amount due, a display element for reporting fraud concerning the first negotiable financial instrument, and when it is determined to present the option to pay, the option to pay the amount due;

responsive to the at least one of the customers selecting the display element for reporting fraud, generating and sending a first fraud reporting message to the payor financial institution, and generating and sending a second fraud reporting message to a corresponding payee financial institution, the first and second fraud reporting messages identifying the first negotiable financial instrument; and responsive to expiration of the time interval:
generating a second user interface for display to the at least one of the customers that provides an indication of the expiration of the time interval in the second user interface, and disabling or removing the option to pay the amount due.

6. The medium of claim 5, wherein the events represent non-sufficient funds (NSF) events in financial accounts of customers of the payor financial institution.

7. The medium of claim 5, the operations further comprising:
responsive to the at least one of the customers selecting the displayed negotiable financial instrument and the option to pay, displaying multiple payment methods; and responsive to the at least one of the customers selecting the one of the payment methods, initiating a payment to the financial account according to the selected payment method.

8. The medium of claim 5, operations further comprising:
processing one or more rules to determine at least one of the service fee and the time interval.

9. A method for providing fraud alert management and real-time remediation via a computer processor programmed with computer executable instructions, the method comprising:
obtaining, by the computer processor, an electronic file, wherein the electronic file includes an exception information data structure comprising exception information representing one or more events, customers associated with the events, and negotiable financial instruments associated with the events and drawn on customer accounts of a payor financial institution, and a contact information data structure comprising electronic addresses for the customers;

responsive to obtaining the exception information, automatically parsing, by the computer processor, the exception information into events for the customers associated with the events; and for at least one of the customers:
- determining, for an event associated with the at least one of the customers, a time interval during which the at least one of the customers may remedy the event, wherein the event is associated with a first negotiable financial instrument, wherein a monetary amount of the first negotiable financial instrument exceeds an available monetary balance of a financial account of the at least one of the customers on which the first negotiable financial instrument is drawn;
- generating and sending, by the computer processor, an event notification message to the electronic address of the at least one of the customers, wherein the event notification message includes a link to an authentication interface of the payor financial institution;
- determining whether to present an option to pay a service fee and an amount due by which the monetary amount the first negotiable financial instrument exceeds the available monetary balance of the financial account of the at least one of the customers using a trained machine learning model that has been trained using unsupervised training with historical correspondences between decisions to present options to pay and parameters of corresponding negotiable financial instruments;
- responsive to the at least one of the customers being authenticated by the authentication interface, providing a first user interface to an electronic customer device for display to the at least one of the customers, wherein the first user interface displays information for events associated with the at least one of the customers and display elements from which a user may select, including an indication of the time interval during which the at least one of the customers may remedy the event, an identification of the first negotiable financial instrument with the service fee and the amount due, a display element for reporting fraud concerning the first negotiable financial instrument, and when it is determined to present the option to pay, the option to pay the amount due;
- responsive to the at least one of the customers selecting the display element for reporting fraud, generating and sending a first fraud reporting message to the payor financial institution, and generating and sending a second fraud reporting message to a corresponding payee financial institution, the first and second fraud reporting messages identifying the first negotiable financial instrument; and
- responsive to expiration of the time interval:
  - generating a second user interface for display to the at least one of the customers that provides an indication of the expiration of the time interval in the second user interface, and
  - disabling or removing the option to pay the amount due.

10. The method of claim 9, wherein the events represent non-sufficient funds (NSF) events in financial accounts of customers of the payor financial institution.

11. The method of claim 9, further comprising:
- responsive to the at least one of the customers selecting the displayed negotiable financial instrument and the option to pay, displaying multiple payment methods; and
- responsive to the at least one of the customers selecting the one of the payment methods, initiating a payment to the financial account according to the selected payment method.

12. The method of claim 9, further comprising:
- processing one or more rules to determine at least one of the service fee and the time interval.

* * * * *

UNITED STATES PATENT AND TRADEMARK OFFICE
CERTIFICATE OF CORRECTION

PATENT NO. : 11,935,063 B1
APPLICATION NO. : 17/860644
DATED : March 19, 2024
INVENTOR(S) : Joel Schwartz et al.

It is certified that error appears in the above-identified patent and that said Letters Patent is hereby corrected as shown below:

In the Claims

Column 30, Line 46 (Claim 8, Line 1), change "5, operations" to --5, the operations--.

Signed and Sealed this
Fourteenth Day of May, 2024

Katherine Kelly Vidal
*Director of the United States Patent and Trademark Office*